US009897373B2

(12) United States Patent
Harrison

(10) Patent No.: US 9,897,373 B2
(45) Date of Patent: Feb. 20, 2018

(54) COOLING CLAMP

(71) Applicant: Frank Harrison, Kansas City, MO (US)

(72) Inventor: Frank Harrison, Kansas City, MO (US)

(*) Notice: Subject to any disclaimer, the term of this patent is extended or adjusted under 35 U.S.C. 154(b) by 620 days.

(21) Appl. No.: 14/571,007

(22) Filed: Dec. 15, 2014

(65) Prior Publication Data

US 2016/0169573 A1 Jun. 16, 2016

(51) Int. Cl.
| | |
|---|---|
| *B25B 5/16* | (2006.01) |
| *F25D 31/00* | (2006.01) |
| *A61J 1/16* | (2006.01) |
| *B23Q 1/00* | (2006.01) |
| *B25B 1/06* | (2006.01) |
| *F25D 15/00* | (2006.01) |
| *F25D 3/02* | (2006.01) |
| *F25D 3/10* | (2006.01) |
| *F25D 3/12* | (2006.01) |

(52) U.S. Cl.
CPC .............. *F25D 31/001* (2013.01); *A61J 1/16* (2013.01); *B23Q 1/00* (2013.01); *B25B 1/06* (2013.01); *F25D 3/02* (2013.01); *F25D 3/10* (2013.01); *F25D 3/12* (2013.01); *F25D 15/00* (2013.01)

(58) Field of Classification Search
CPC .... B25B 1/00; B25B 1/02; B25B 1/04; B25B 5/02; B25B 7/00; B25B 9/04
See application file for complete search history.

(56) References Cited

U.S. PATENT DOCUMENTS

| | | | | |
|---|---|---|---|---|
| 4,191,367 | A * | 3/1980 | Speiser | B25B 1/02 269/203 |
| 4,685,663 | A * | 8/1987 | Jorgensen | B25B 1/103 269/244 |
| 5,163,662 | A * | 11/1992 | Bernstein | B25B 1/103 269/136 |
| 5,806,841 | A * | 9/1998 | Hebener | B23B 31/265 269/157 |
| 5,988,618 | A * | 11/1999 | Meintrup | B23Q 1/035 269/266 |
| 6,036,184 | A * | 3/2000 | Wurthele | B25B 1/103 269/154 |
| 7,185,798 | B2 * | 3/2007 | Butler | B23K 37/0533 228/44.5 |
| 2011/0291342 | A1* | 12/2011 | Gindy | B25B 1/2421 269/266 |
| 2016/0169573 | A1* | 6/2016 | Harrison | F25D 3/06 62/293 |

* cited by examiner

*Primary Examiner* — Lee D Wilson
(74) *Attorney, Agent, or Firm* — Hovey Williams LLP

(57) ABSTRACT

A cooling clamp is operable to hold coolant and an item in proximity to one another and includes a pair of relatively shiftable jaws and a receptacle mounted to at least one of the jaws. The jaws are shiftable into and out of a closed position, with the jaws being configured to receive at least a portion of the item therebetween and apply a clamping pressure to the item when in the closed position. The receptacle is mounted to at least one of the jaws and presents a chamber to receive the coolant. The receptacle includes an exposed wall section that defines in part the chamber and is configured to contact the item when the jaws are in the closed position, with the exposed wall section thereby serving as a direct thermal conductor between the item and the coolant.

38 Claims, 19 Drawing Sheets

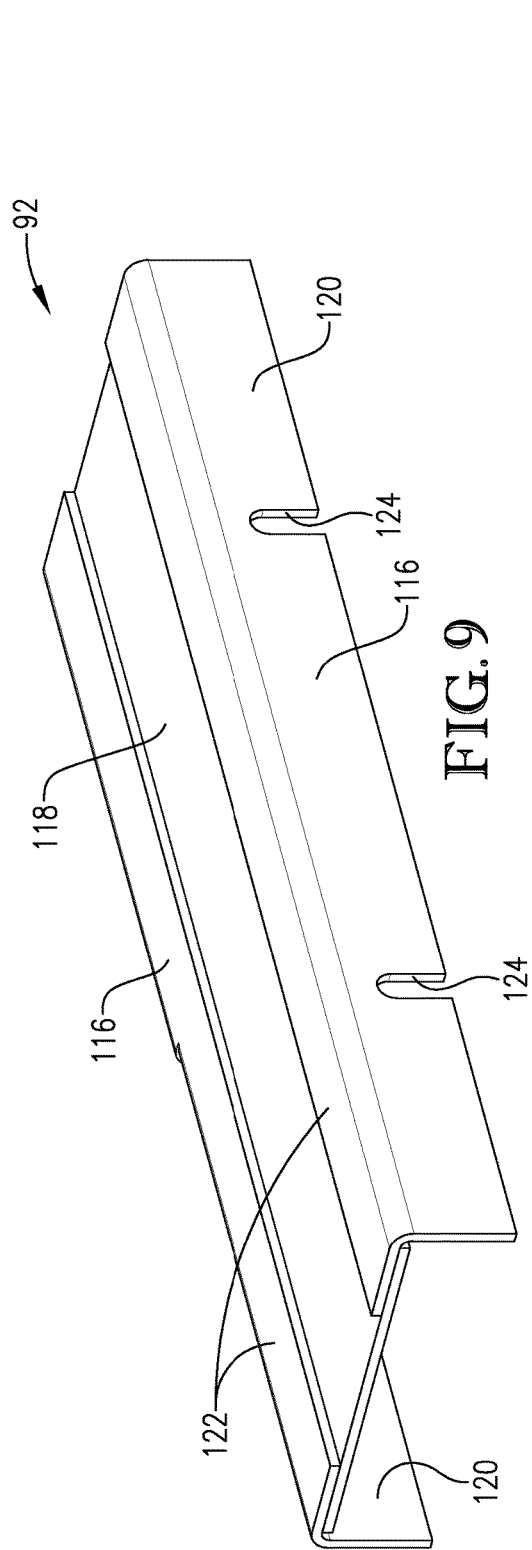
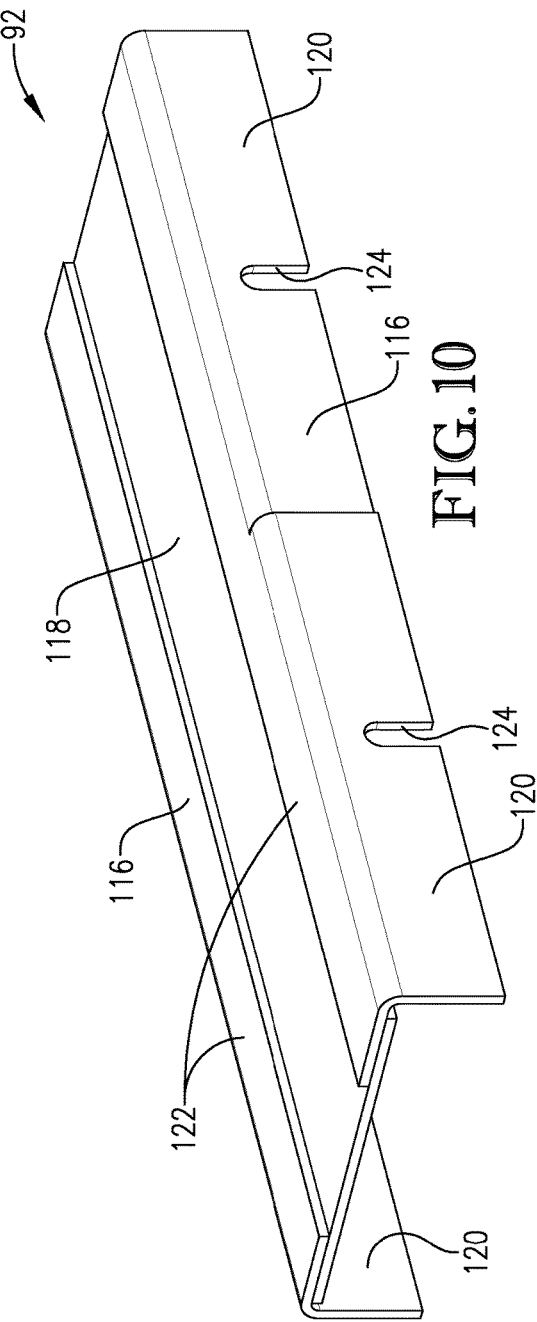

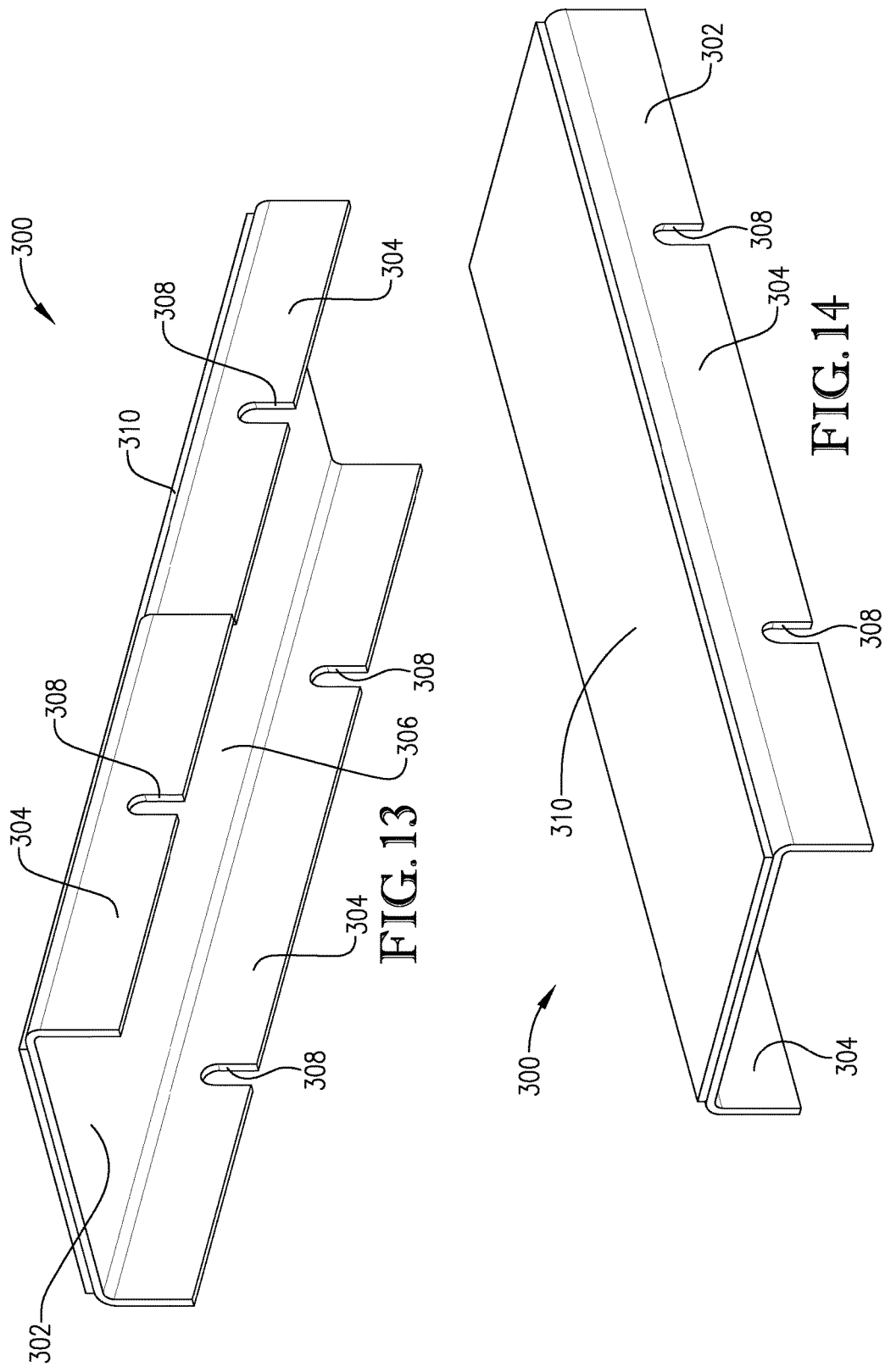

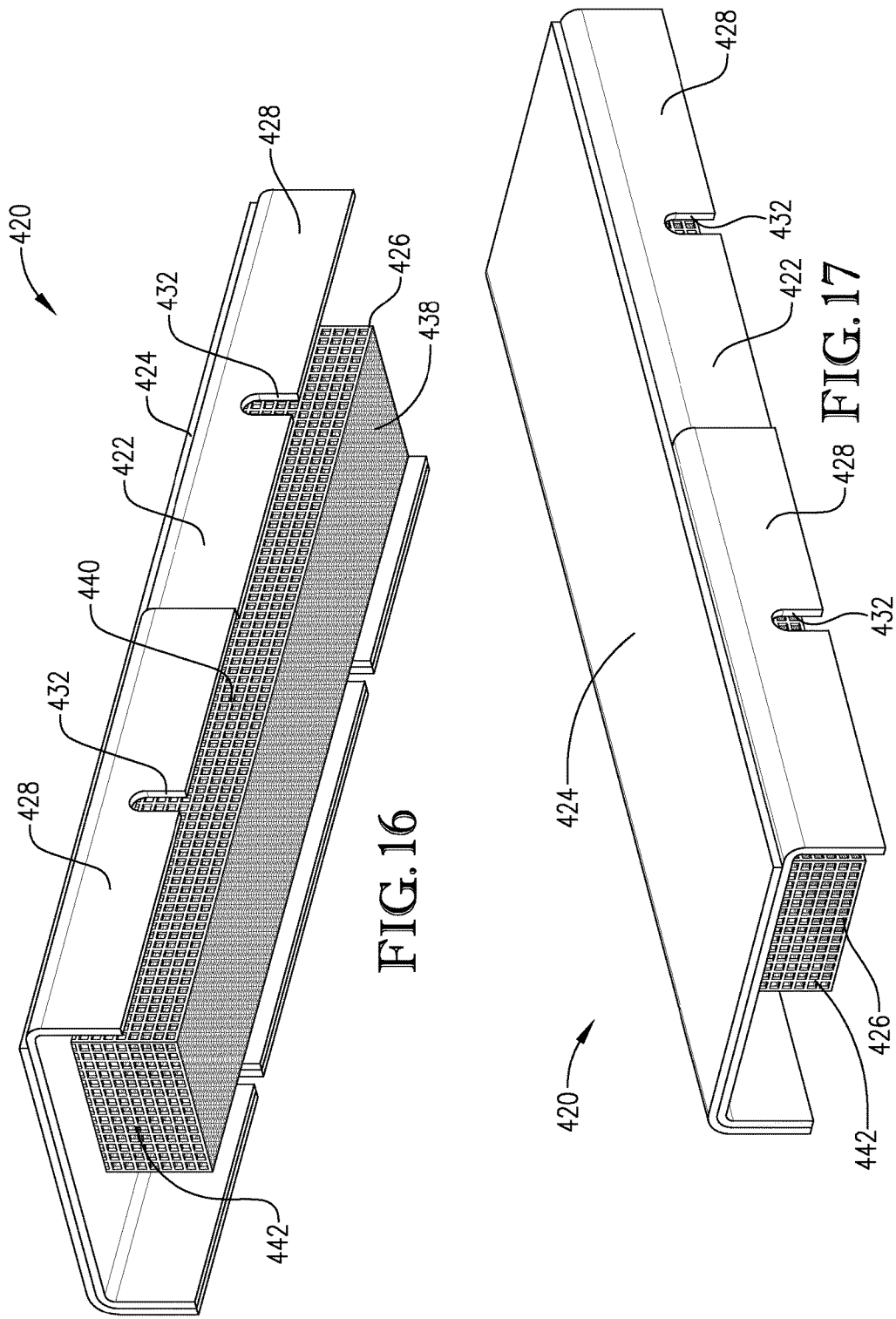

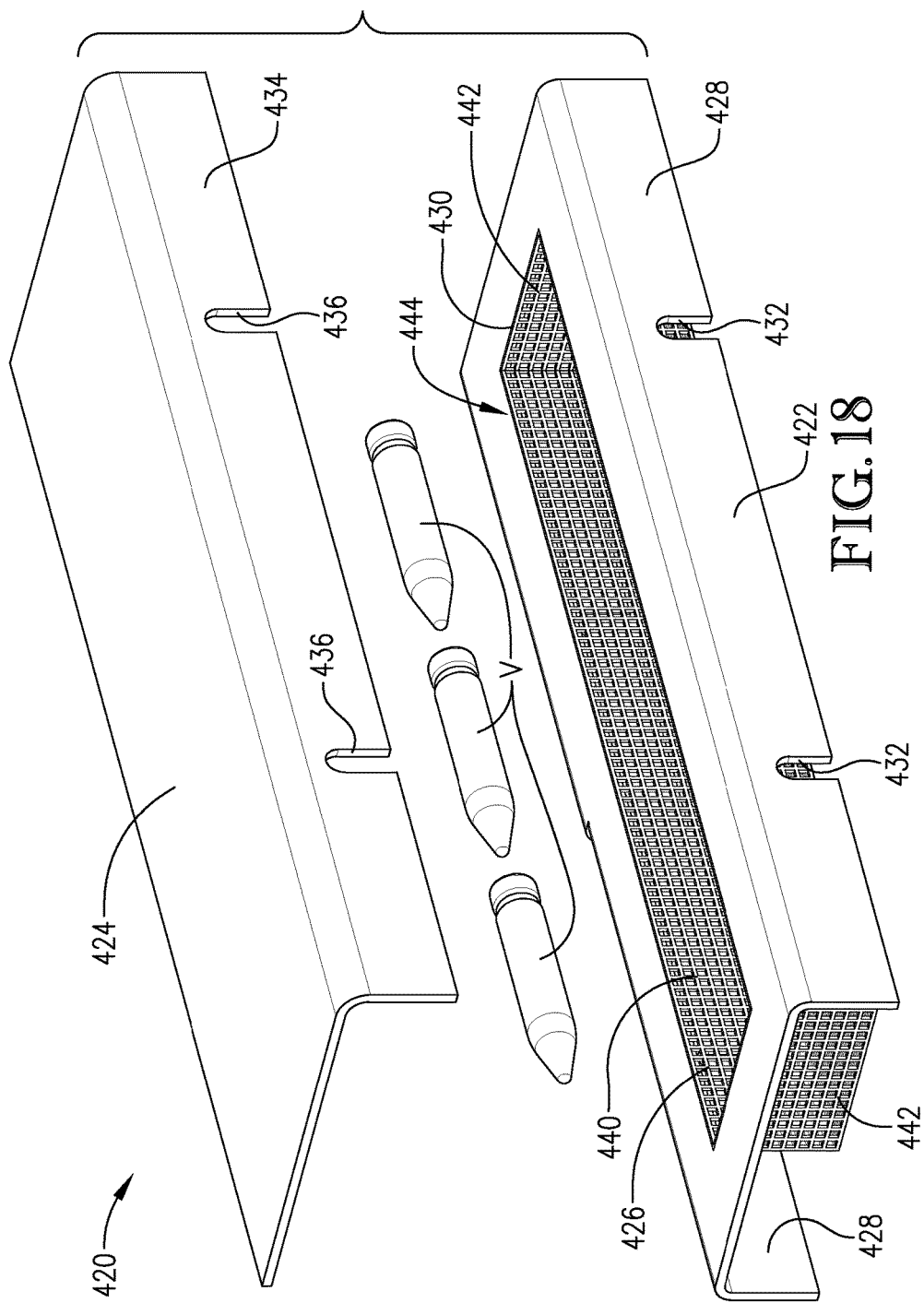

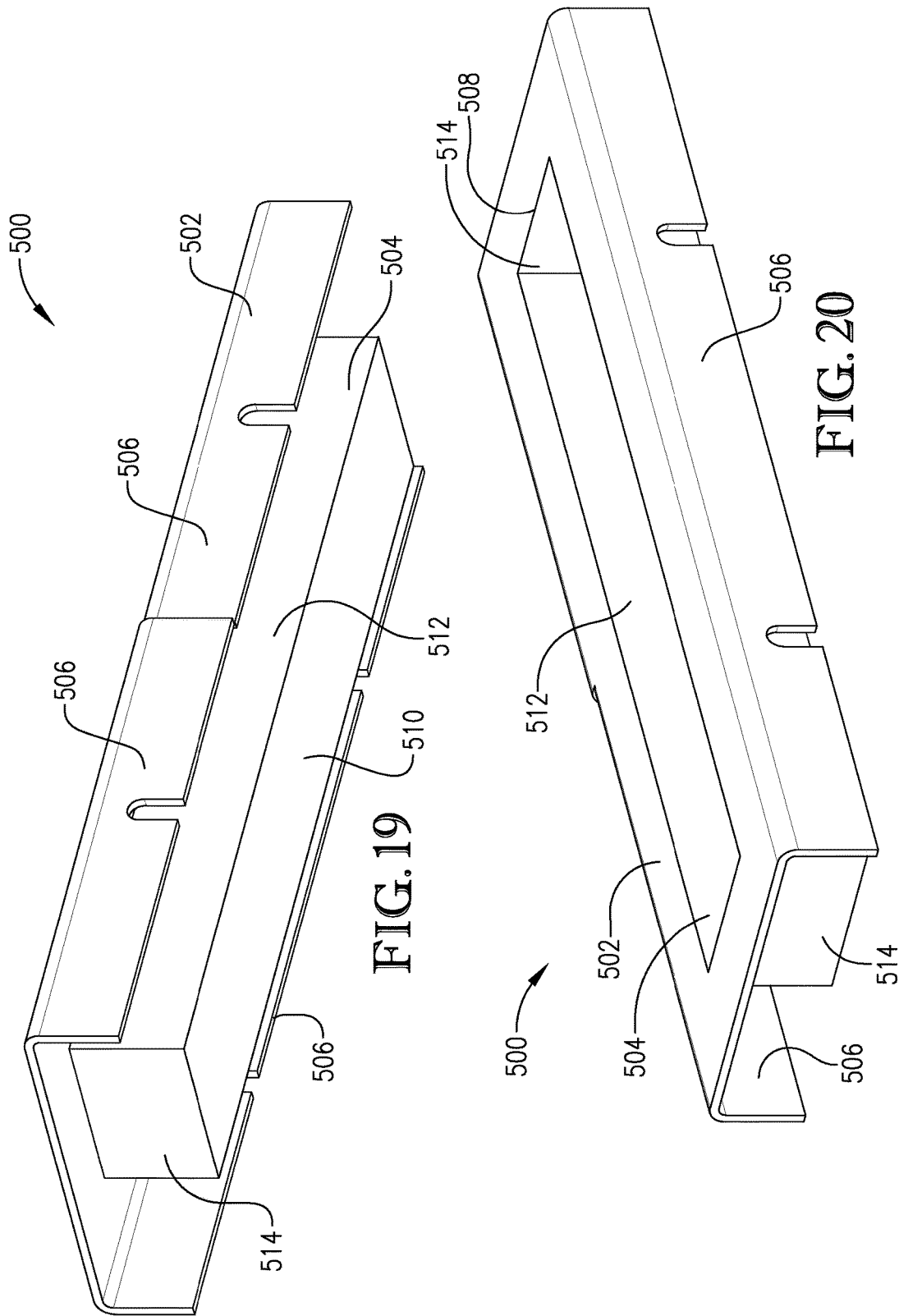

COOLING CLAMP

BACKGROUND

1. Field

The present invention relates generally to devices configured to cool an item, e.g., during fabrication of the item. More specifically, embodiments of the present invention concern a clamp with a receptacle that holds a coolant adjacent to a clamping face to remove heat from a clamped item.

2. Discussion of Prior Art

It is well known in the art to use an insulated cooler or a powered refrigeration system to remove heat from various items in order to chill (or freeze) an item. In cooling applications that require an item to be quickly frozen, a very low-temperature coolant, such as dry ice, is used to flash freeze the item. In conventional use, dry ice is placed in a large insulated container with the item to be frozen. To minimize the rate at which the dry ice within the container sublimates (i.e., the rate at which the carbon dioxide goes from the solid phase to the gas phase), the dry ice container includes a relatively thick layer of insulation.

However, the prior art containers and methods for using dry ice have various deficiencies. For instance, the prior art containers are inconvenient for a person to manually move and position. Also, the container door must be closed while the item being frozen is in the container in order to minimize the rate of sublimation of the dry ice.

SUMMARY

The following brief summary is provided to indicate the nature of the subject matter disclosed herein. While certain aspects of the present invention are described below, the summary is not intended to limit the scope of the present invention.

Embodiments of the present invention provide a cooling clamp that does not suffer from the problems and limitations of the prior art cooling containers set forth above.

A first aspect of the present invention concerns a cooling clamp operable to hold coolant and an item in proximity to one another. The cooling clamp broadly includes a pair of relatively shiftable jaws and a receptacle. The jaws are operable to shift into and out of a closed position, with the jaws being configured to receive at least a portion of the item therebetween and apply a clamping pressure to the item when in the closed position. The receptacle is mounted to at least one of the jaws and presents a chamber to receive the coolant. The receptacle includes an exposed wall section defining in part the chamber and is configured to contact the item when the jaws are in the closed position, with the exposed wall section thereby serving as a direct thermal conductor between the item and the coolant.

A second aspect of the present invention concerns an insulated coolant receptacle operable to be mounted to at least one of a pair of relatively shiftable jaws of a clamp. The jaws are operable to shift into and out of a closed position. The jaws are also configured to receive at least a portion of an item therebetween and apply a clamping pressure to the item when in the closed position. The insulated coolant receptacle broadly includes a receptacle shell, an exposed wall section, and an insulating layer. The receptacle shell presents an exterior shell surface. The exposed wall section cooperates with the receptacle shell to define a coolant chamber. The exposed wall section is configured to contact the item when the jaws are in the closed position, with the exposed wall section thereby serving as a direct thermal conductor between the item and the coolant. The insulating layer is applied to the exterior shell surface and is operable to insulate coolant within the chamber from ambient conditions.

A third aspect of the present invention concerns a coolant receptacle operable to be mounted to at least one of a pair of relatively shiftable jaws of a clamp. The jaws are operable to shift into and out of a closed position. The jaws are also configured to receive at least a portion of an item therebetween and apply a clamping pressure to the item when in the closed position. The coolant receptacle broadly includes a receptacle shell and an exposed wall section. The exposed wall section cooperates with the receptacle shell to define a coolant chamber. The exposed wall section is configured to contact the item when the jaws are in the closed position, with the exposed wall section thereby serving as a direct thermal conductor between the item and the coolant. The exposed wall section includes a flexible elastomeric layer such that the wall section resiliently flexes in response to engagement with the item and thereby conforms to the item.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 6:
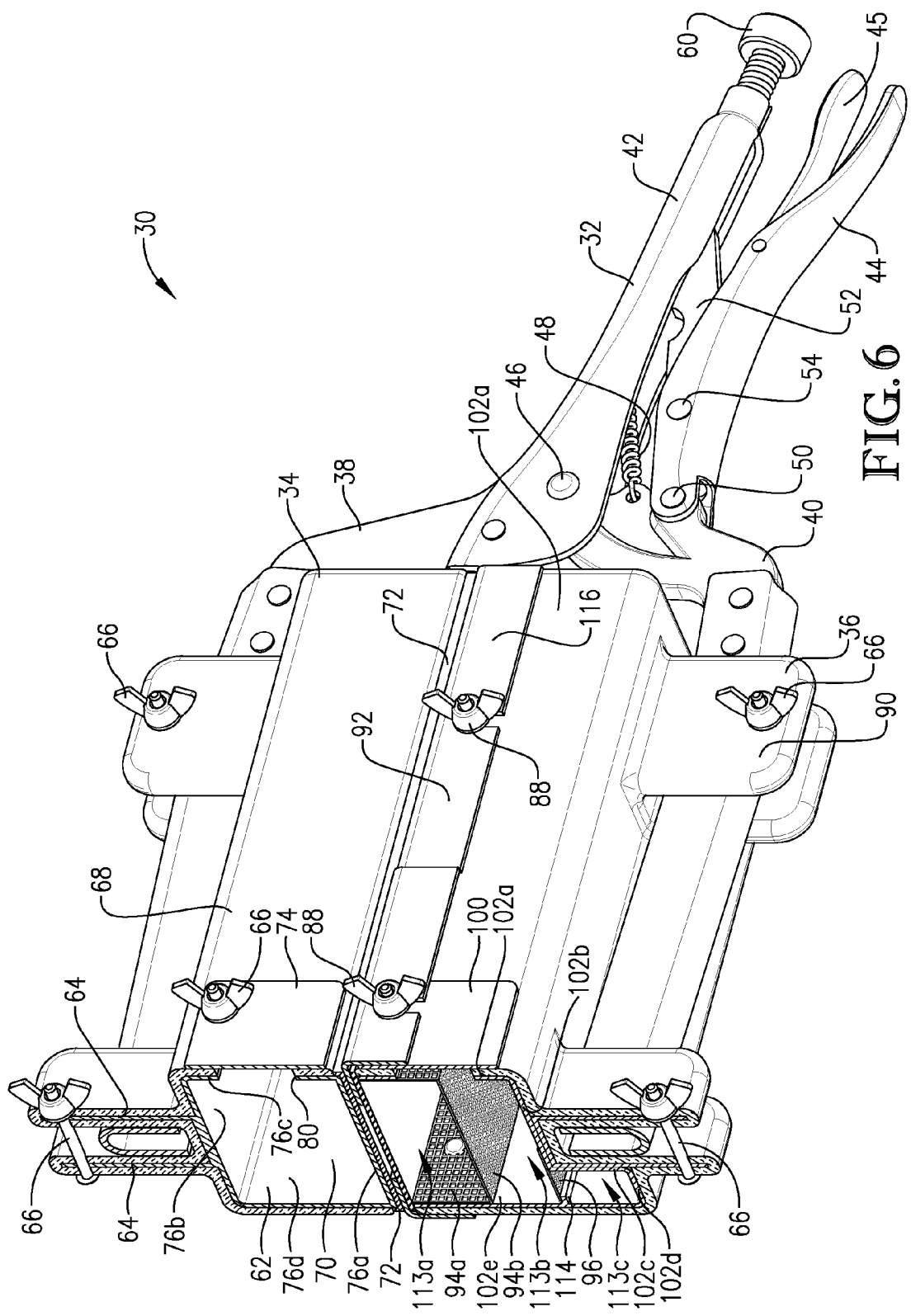
FIG. 6 is a fragmentary perspective of the cooling clamp shown in FIGS. 1-5, showing the hand clamp and receptacles cross sectioned along a transverse axis.
Figure 7:
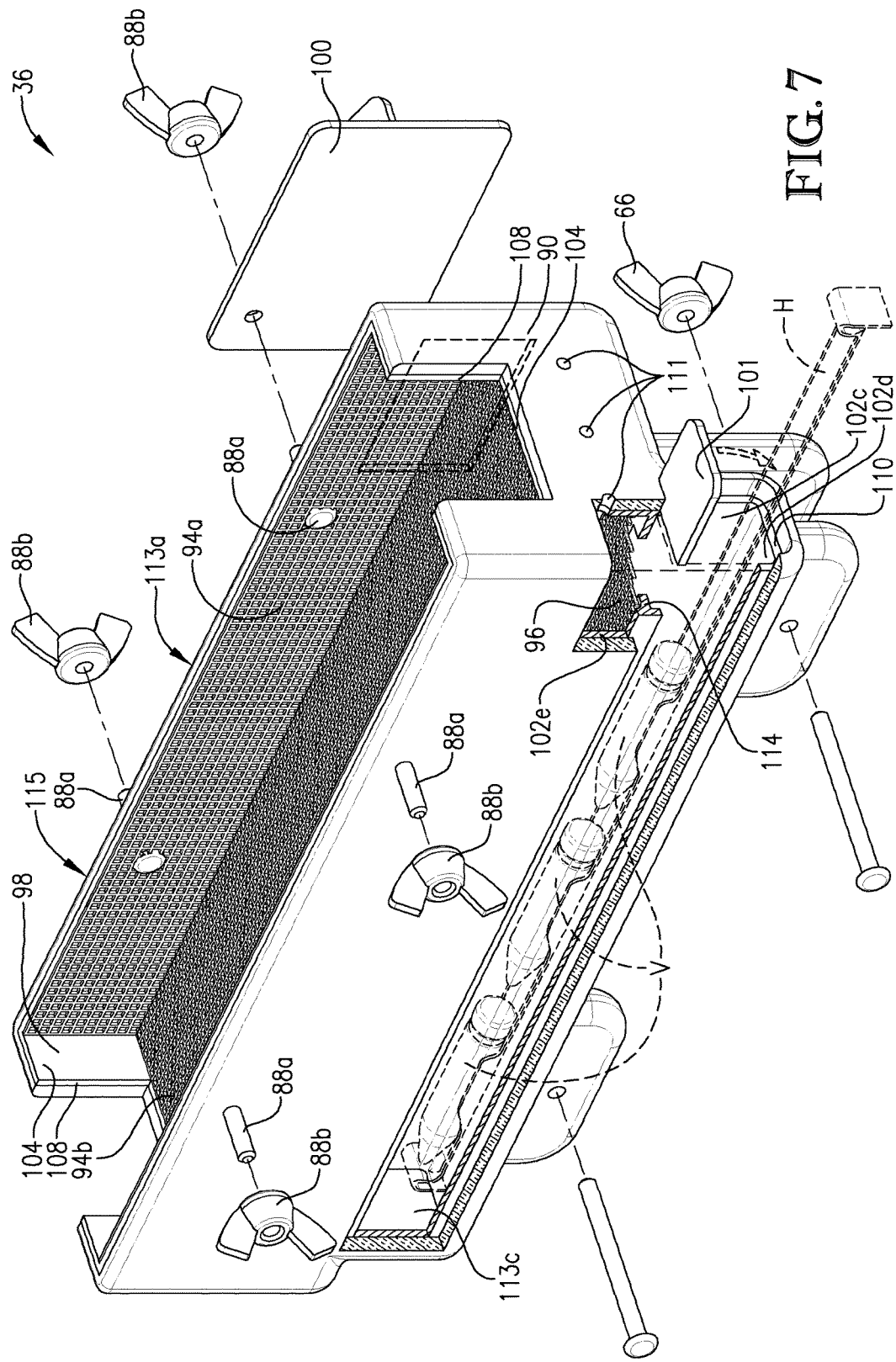
Figure 8:
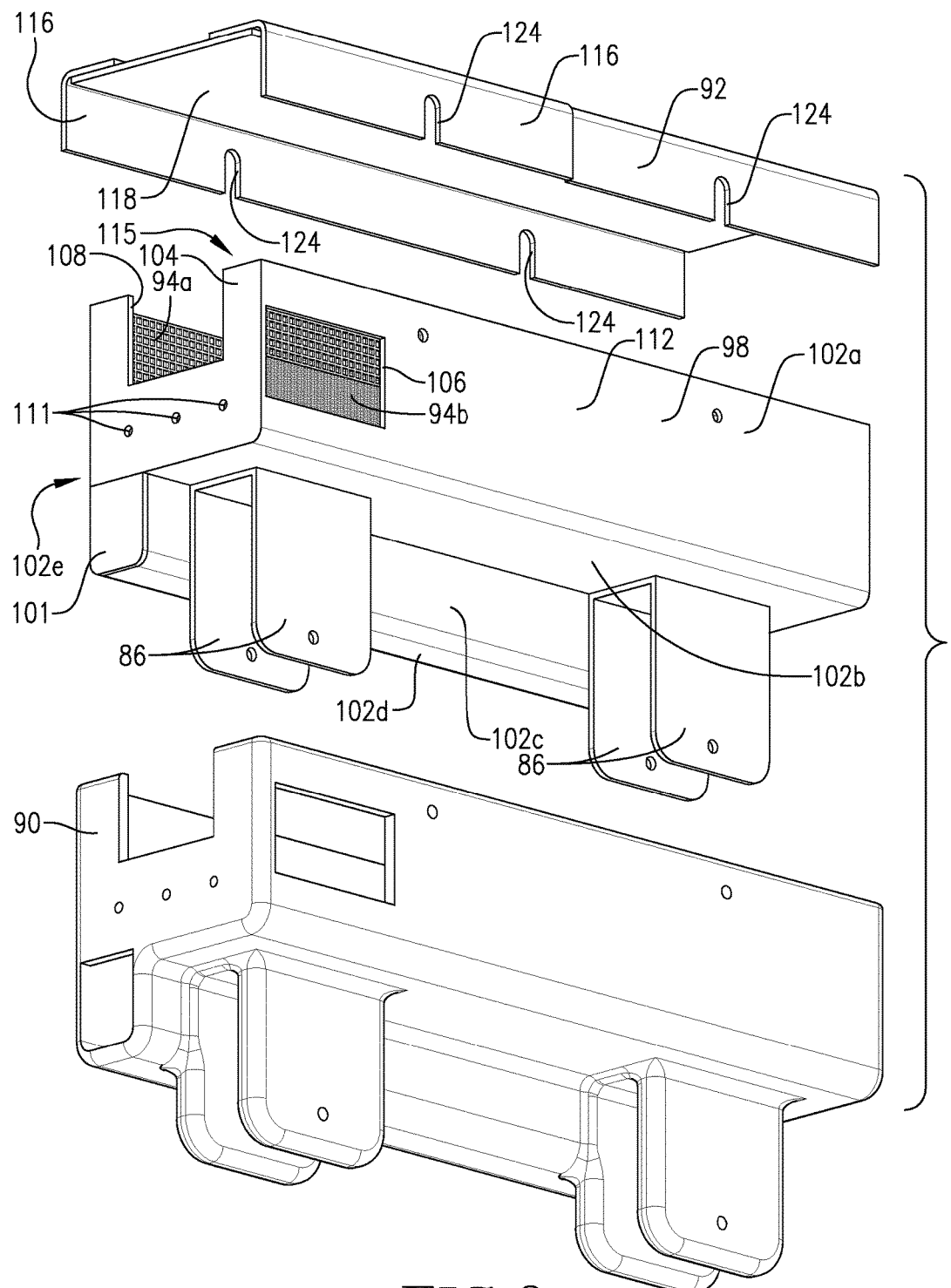
Figure 11:
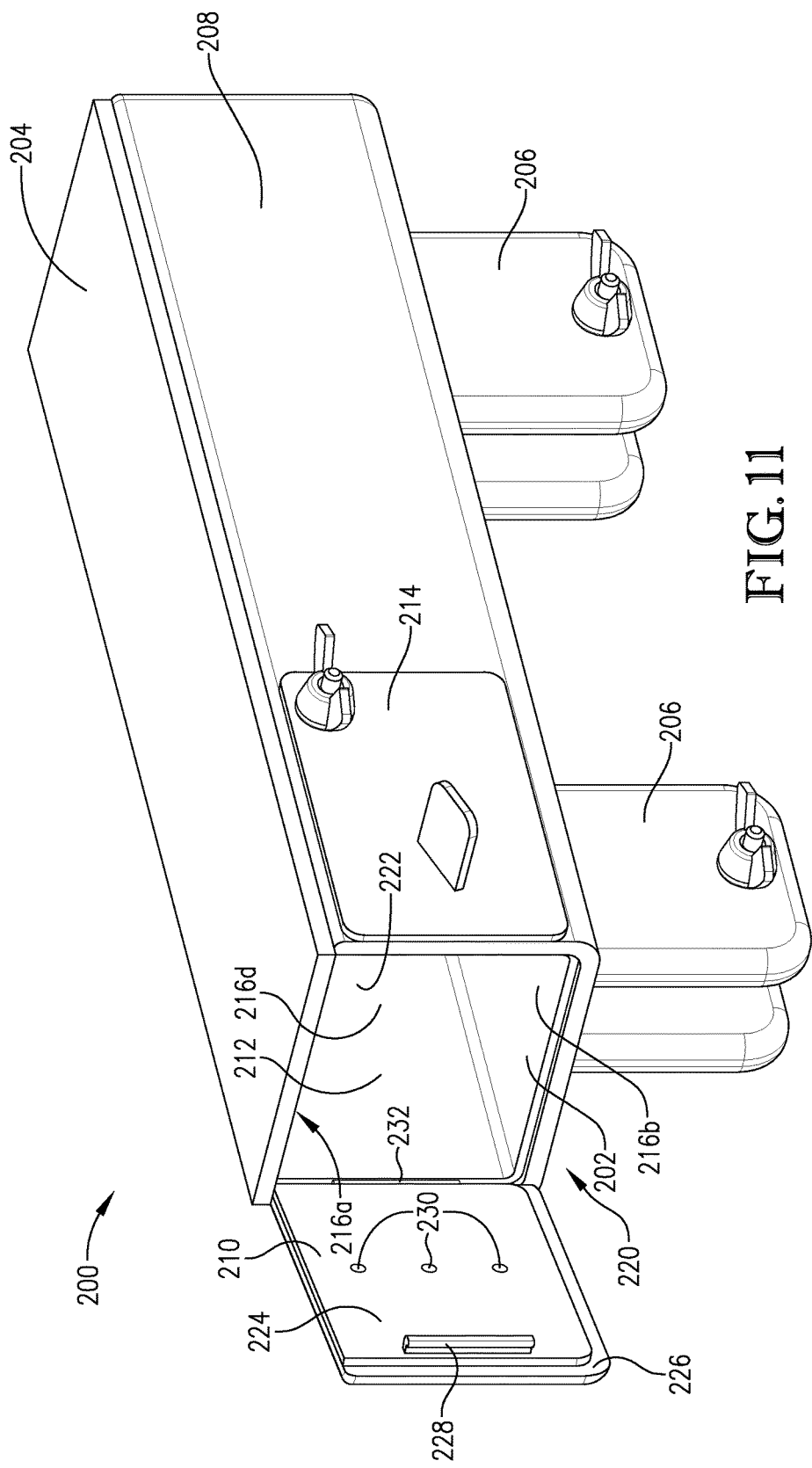
Figure 12:
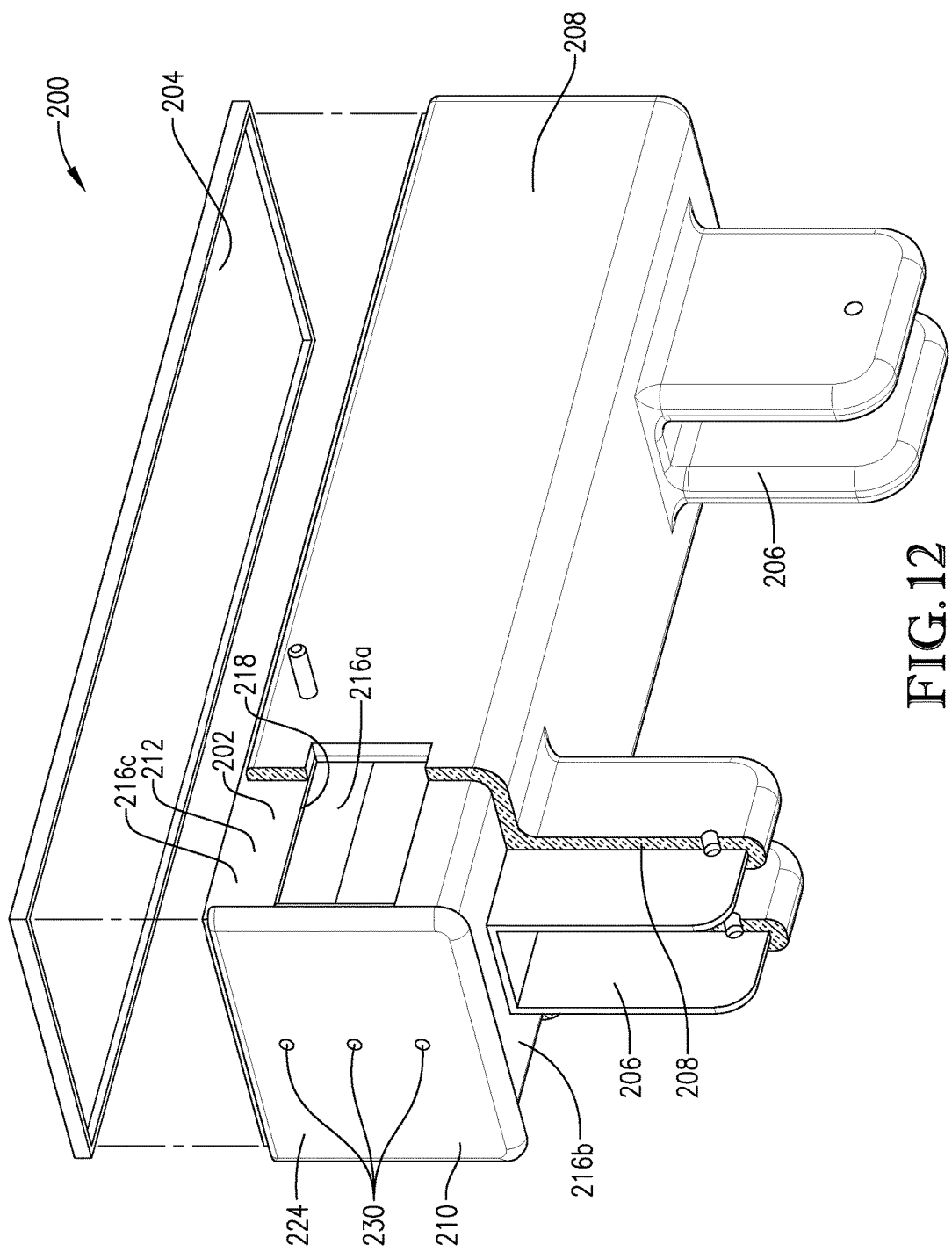
Figure 15:
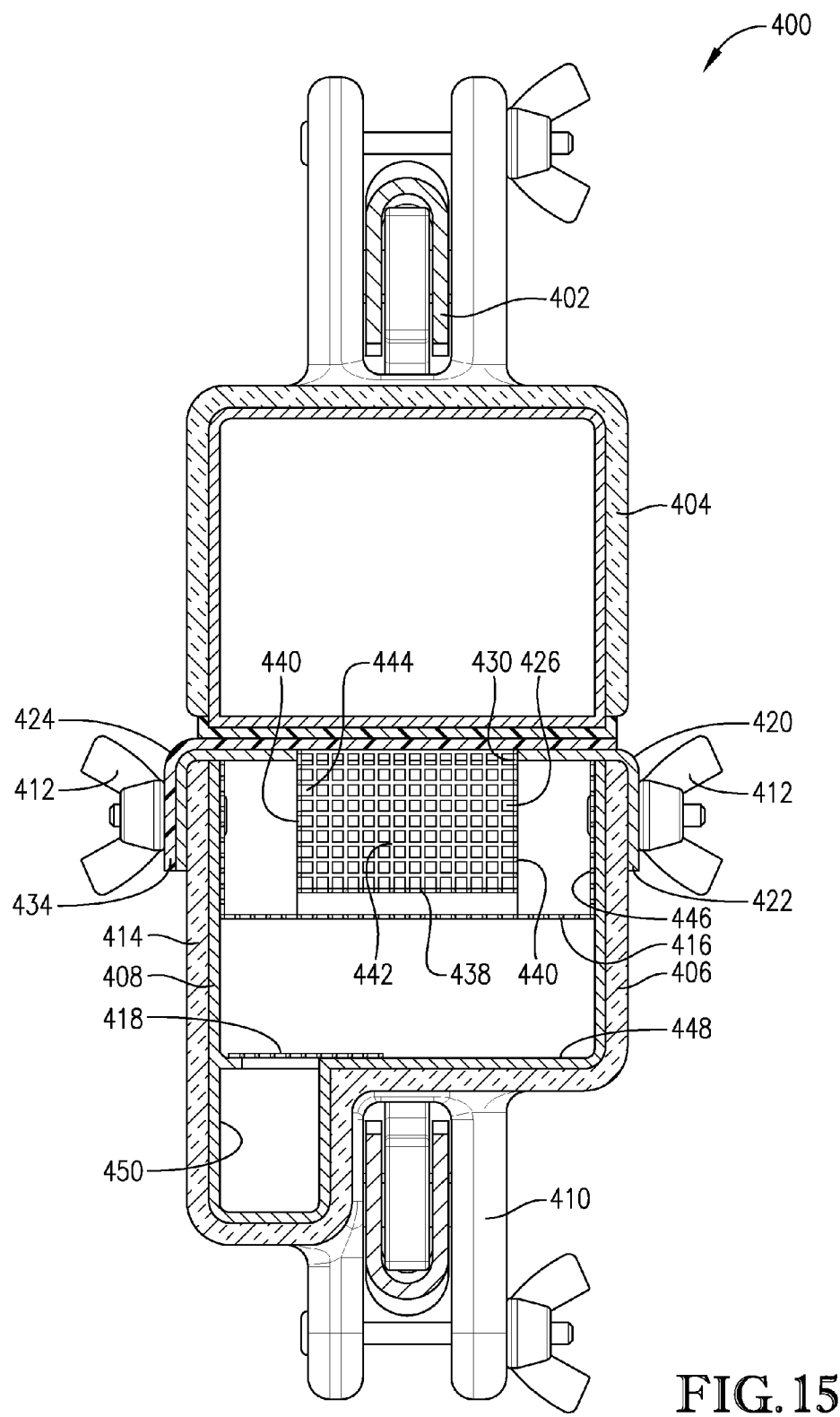
Figure 21:
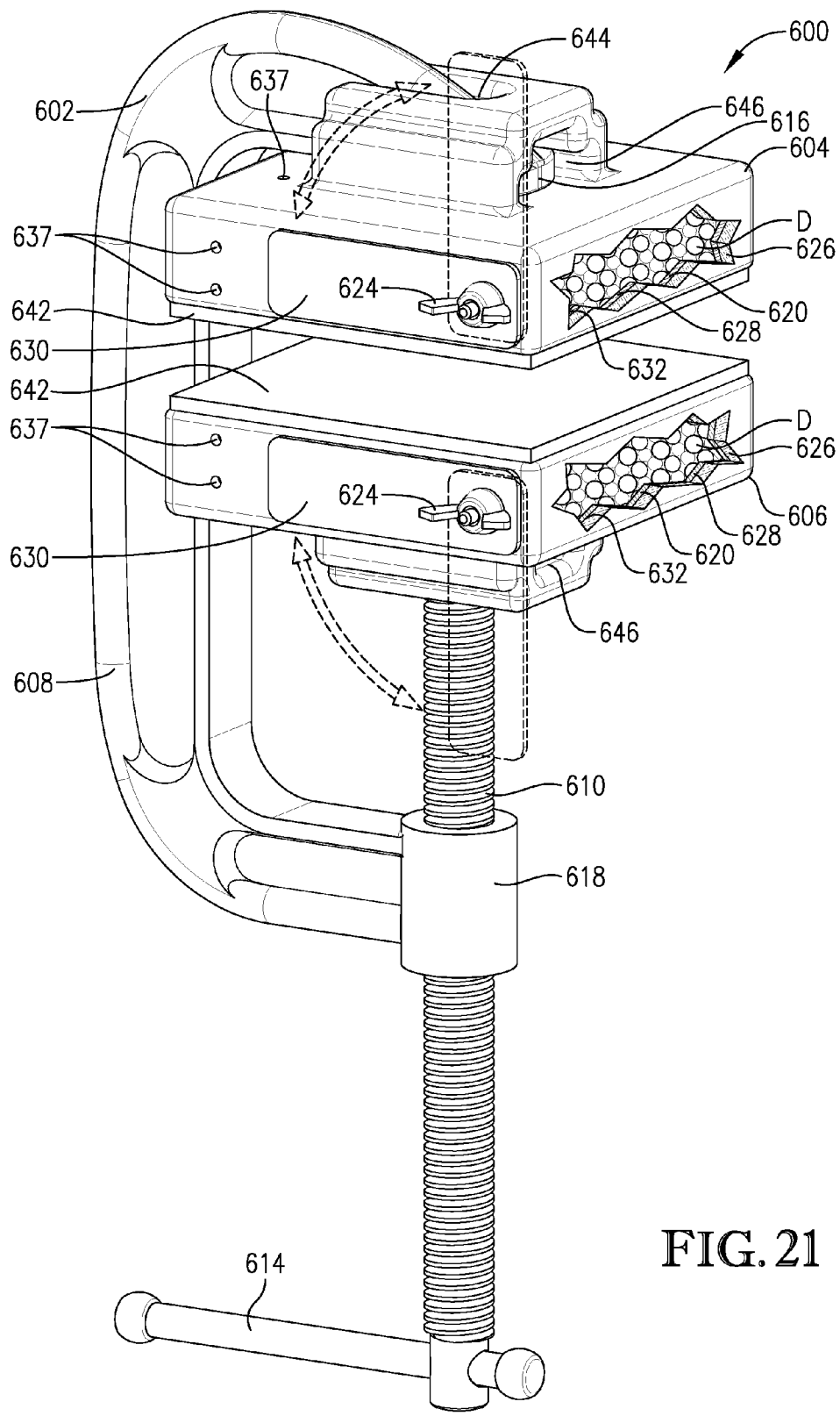
Figure 22:
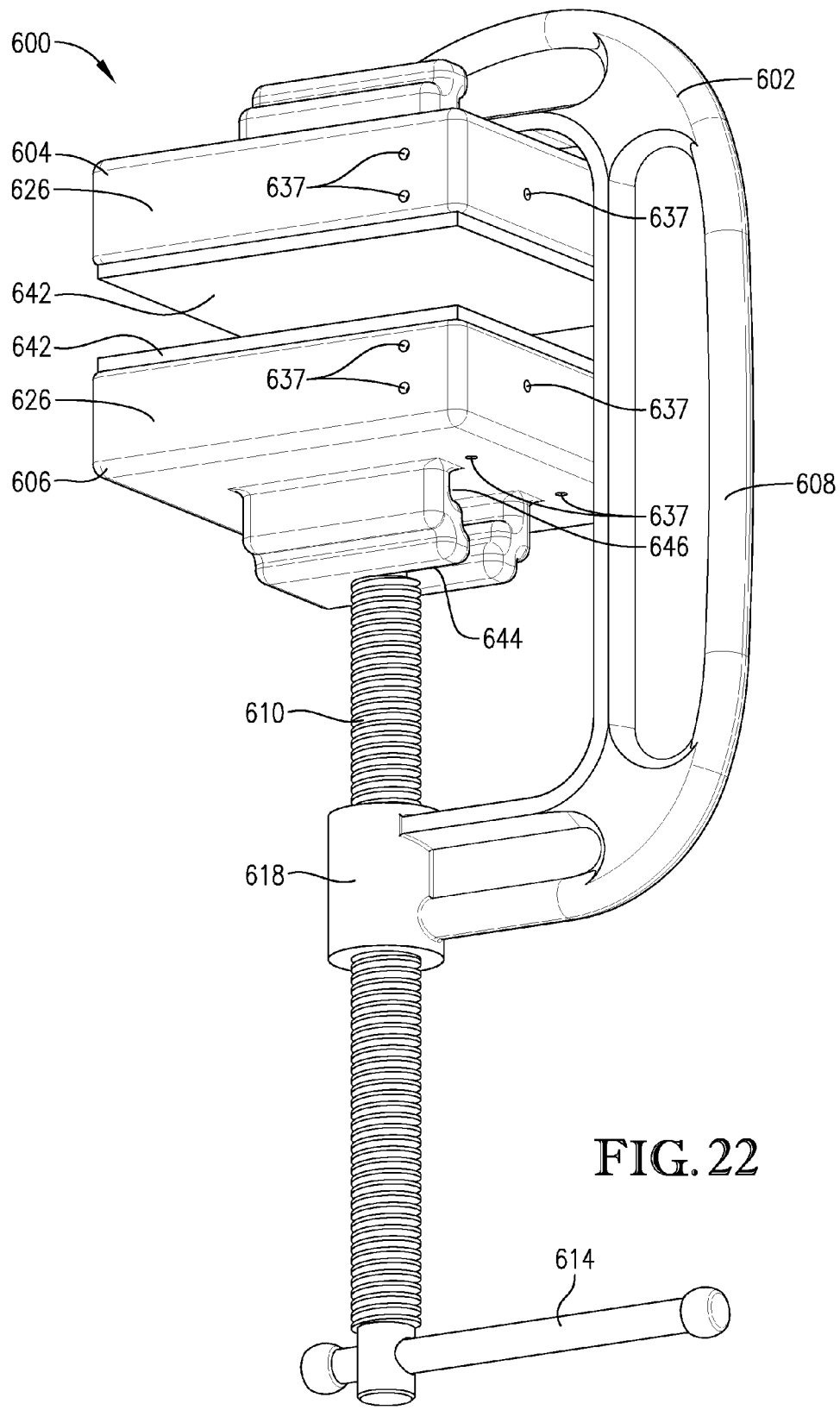

FIG. 7 is a fragmentary perspective of the lower insulated receptacle shown in FIGS. 1-6, with the cover removed to show a partition that partly defines an upper sub-chamber, and showing part of the receptacle broken away to show intermediate and lower sub-chambers, with a side door being exploded from the receptacle and an end door being opened, and further showing the vials received in the lower sub-chamber;

FIG. 8 is an exploded perspective of the lower insulated receptacle shown in FIGS. 1-7, showing an insulating layer and the removable cover exploded from the receptacle shell and brackets;

FIG. 9 is a perspective of the removable cover shown in FIGS. 1-8, with the cover including a pair of side rails and a flexible lid that interconnects the side rails;

FIG. 10 is a perspective of the removable cover similar to FIG. 9, but taken from the opposite direction;

FIG. 11 is an upper perspective of an insulated receptacle constructed in accordance with a second embodiment of the present invention, showing a receptacle shell, a shell cover layer, brackets, an insulating layer, and a shiftable cover of the receptacle;

FIG. 12 is a fragmentary lower perspective of the insulated receptacle shown in FIG. 11, showing the cover layer exploded from the shell and part of the insulating layer removed to expose part of the shell and brackets, with the door being removed to depict a side opening presented by the shell;

FIG. 13 is a lower perspective of a removable cover constructed in accordance with a third embodiment of the present invention, showing a unitary cover body and a cover layer;

FIG. 14 is an upper perspective of the removable cover shown in FIG. 13;

FIG. 15 is a cross section of a cooling clamp constructed in accordance with a fourth embodiment of the present invention, showing a hand clamp and insulated receptacles, with a lower one of the receptacles including a receptacle shell, brackets, fasteners, an insulating layer, perforated partitions, and an alternative removable cover;

FIG. 16 is a lower perspective of the removable cover shown in FIG. 15, with the removable cover including a cover frame, a lid, and a perforated partition;

FIG. 17 is an upper perspective of the removable cover shown in FIGS. 15 and 16;

FIG. 18 is an exploded perspective of the removable cover shown in FIGS. 15-17, with the lid being exploded from the cover frame to permit vials to be inserted between the lid and the partition;

FIG. 19 is a lower perspective of a removable cover constructed in accordance with a fifth embodiment of the present invention, showing a cover frame and a central partition of the removable cover;

FIG. 20 is an upper perspective of the removable cover shown in FIG. 19;

FIG. 21 is an upper perspective of a cooling clamp constructed in accordance with a sixth embodiment of the present invention, showing a C-clamp and insulated receptacles attached to the C-clamp;

FIG. 22 is a lower perspective of the cooling clamp shown in FIG. 21; and

Figure 23:
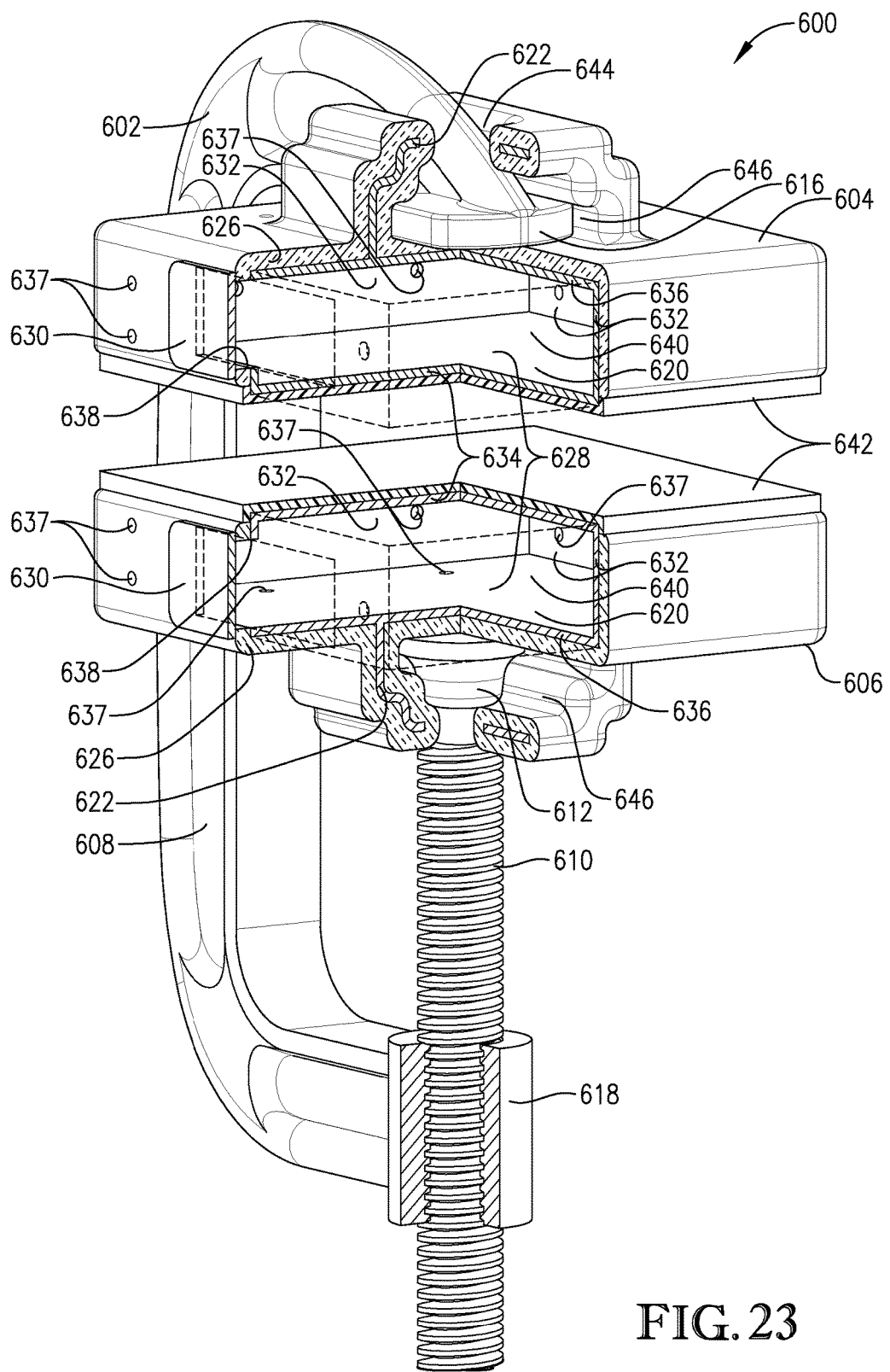

FIG. 23 is a fragmentary upper perspective of the cooling clamp shown in FIGS. 21 and 22, with the receptacles each including a receptacle shell, a bracket, fasteners, a cover layer, and an insulating layer.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
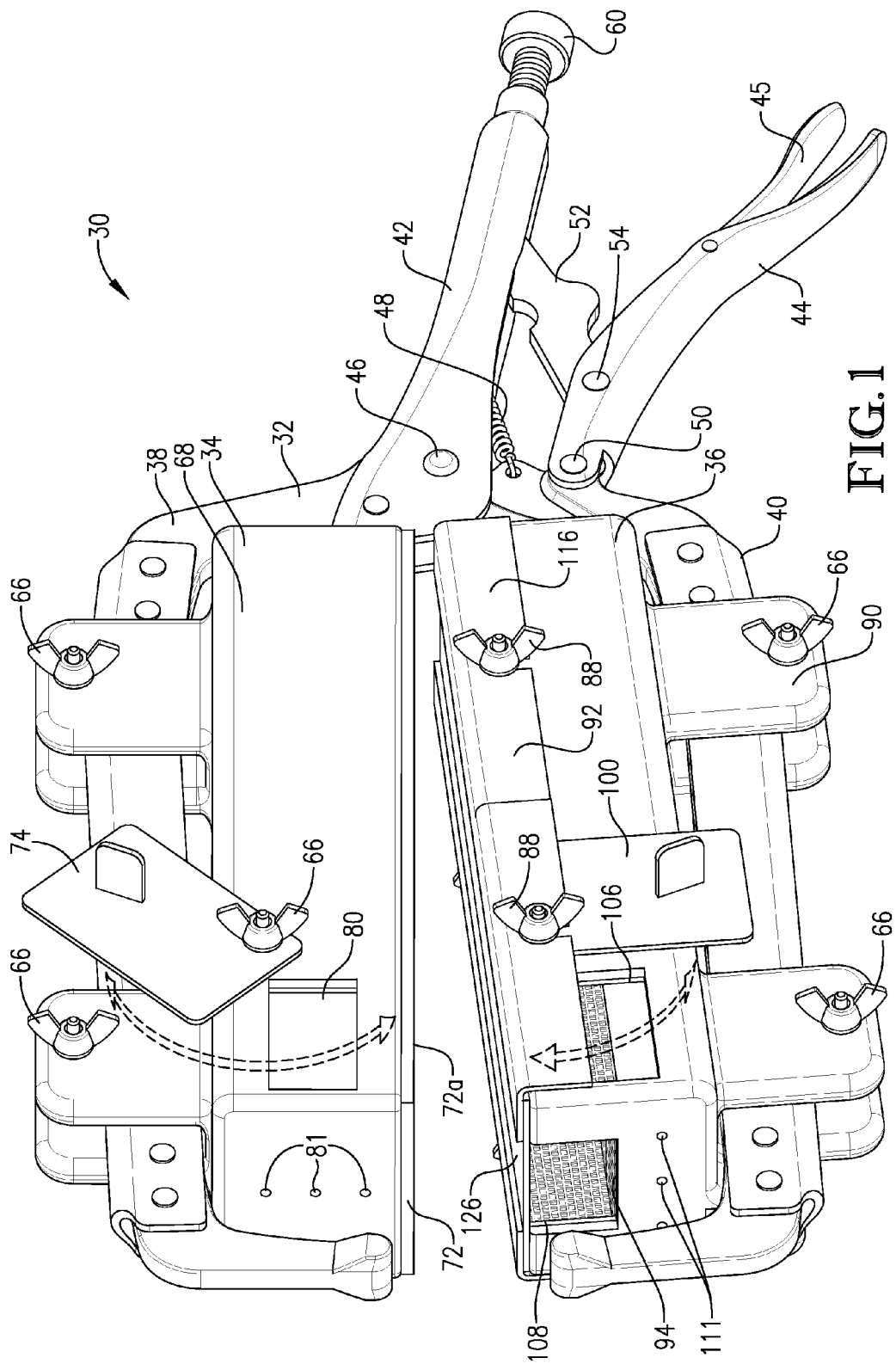
FIG. 1 is a perspective of a cooling clamp constructed in accordance with a first embodiment of the present invention, with the cooling clamp including a hand clamp, an upper insulated receptacle with a fixed cover, and a lower insulated receptacle with a removable cover.
Figure 2:
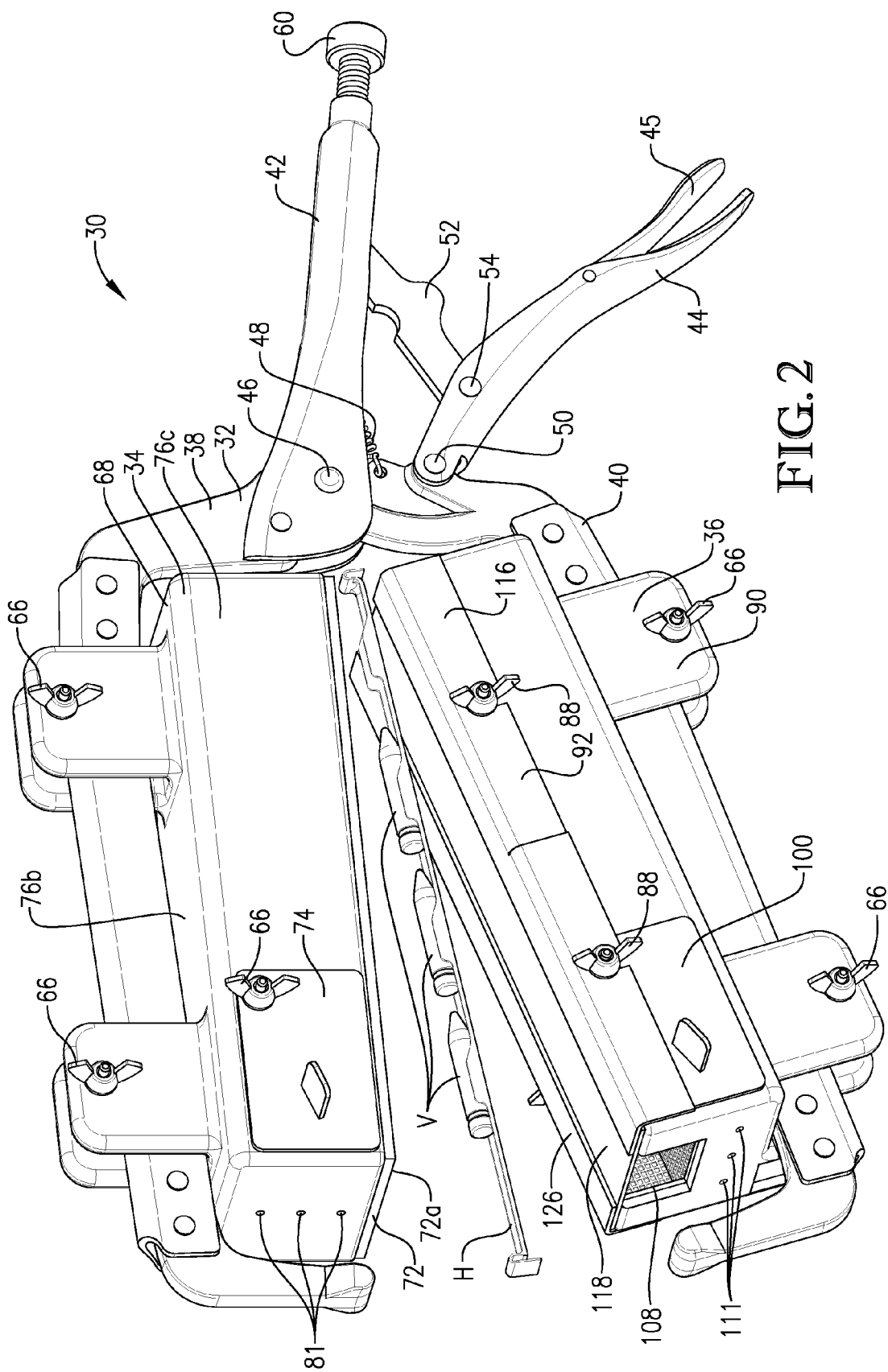
FIG. 2 is a perspective of the cooling clamp similar to FIG. 1, but with the cooling clamp being opened to receive several vials mounted on a holder.
Figure 3:
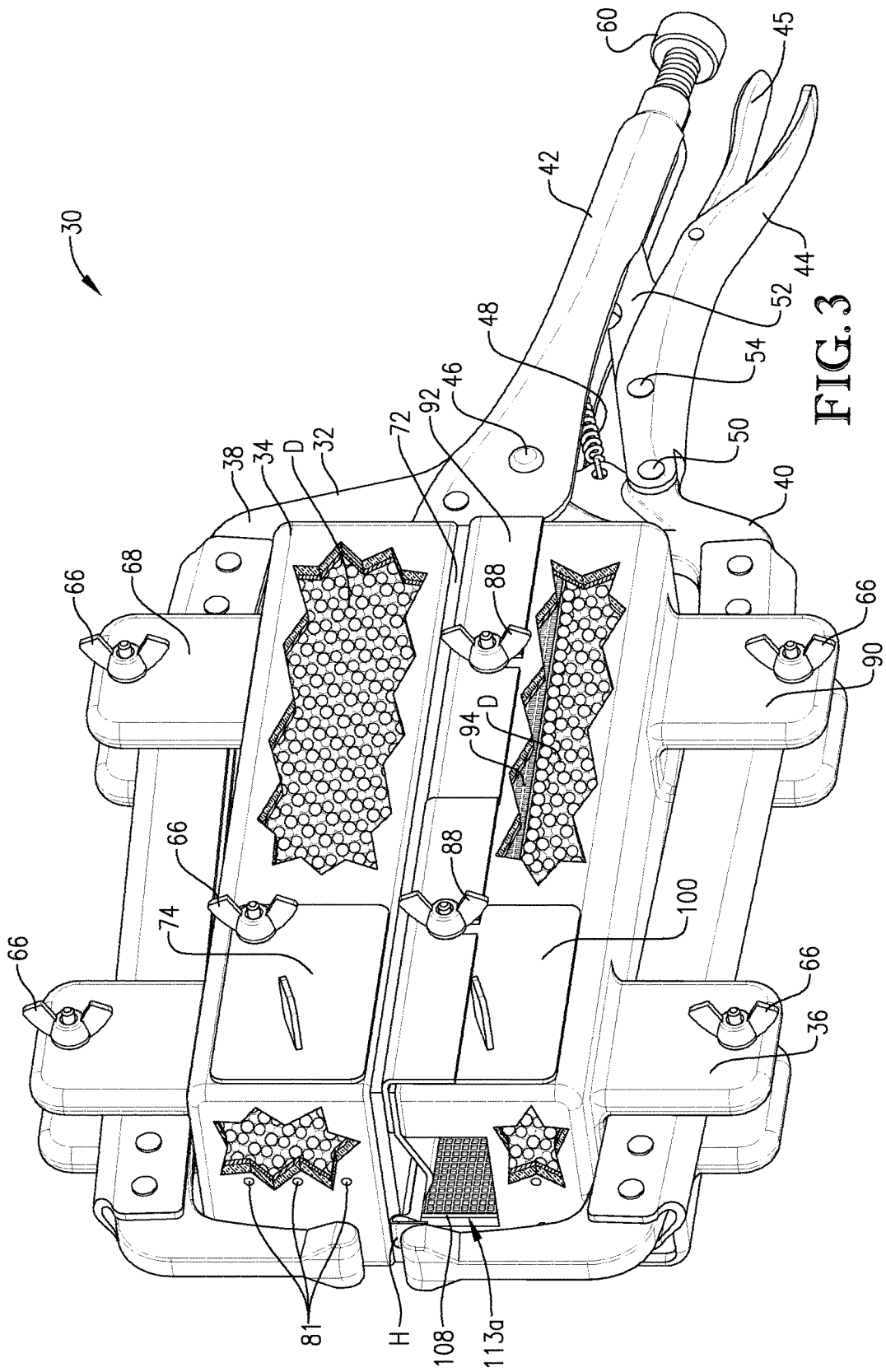
FIG. 3 is a perspective of the cooling clamp similar to FIG. 2, but with the cooling clamp being closed so that the receptacles cooperatively grasp the vials and holder therebetween, particularly showing the wall section of one of the coolant receptacles flexing to conform to the shape of the vials.
Figure 4:
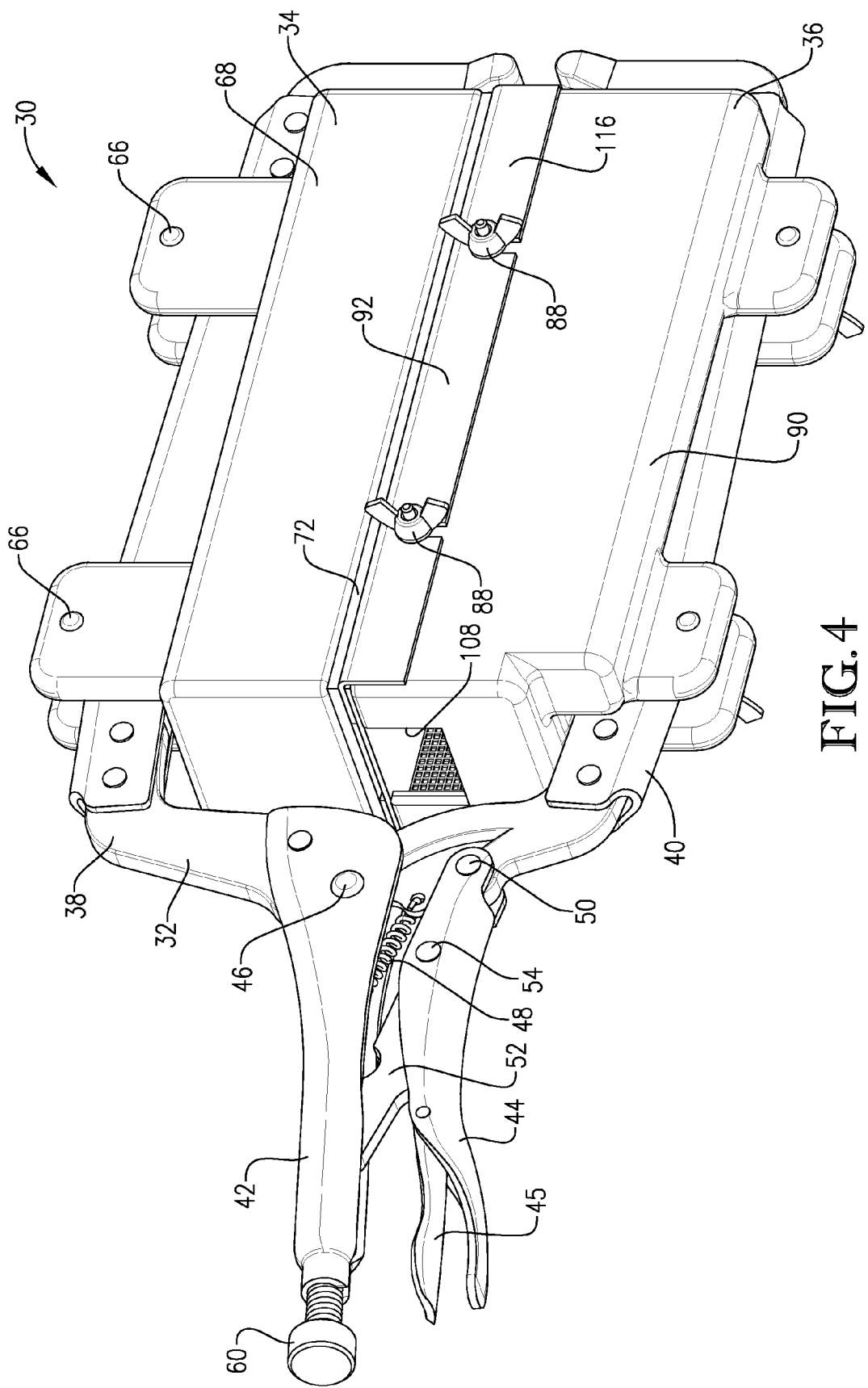
FIG. 4 is a perspective of the cooling clamp similar to FIG. 3, but taken from the opposite direction, with the vials and holder being removed from the cooling clamp.
Figure 5:
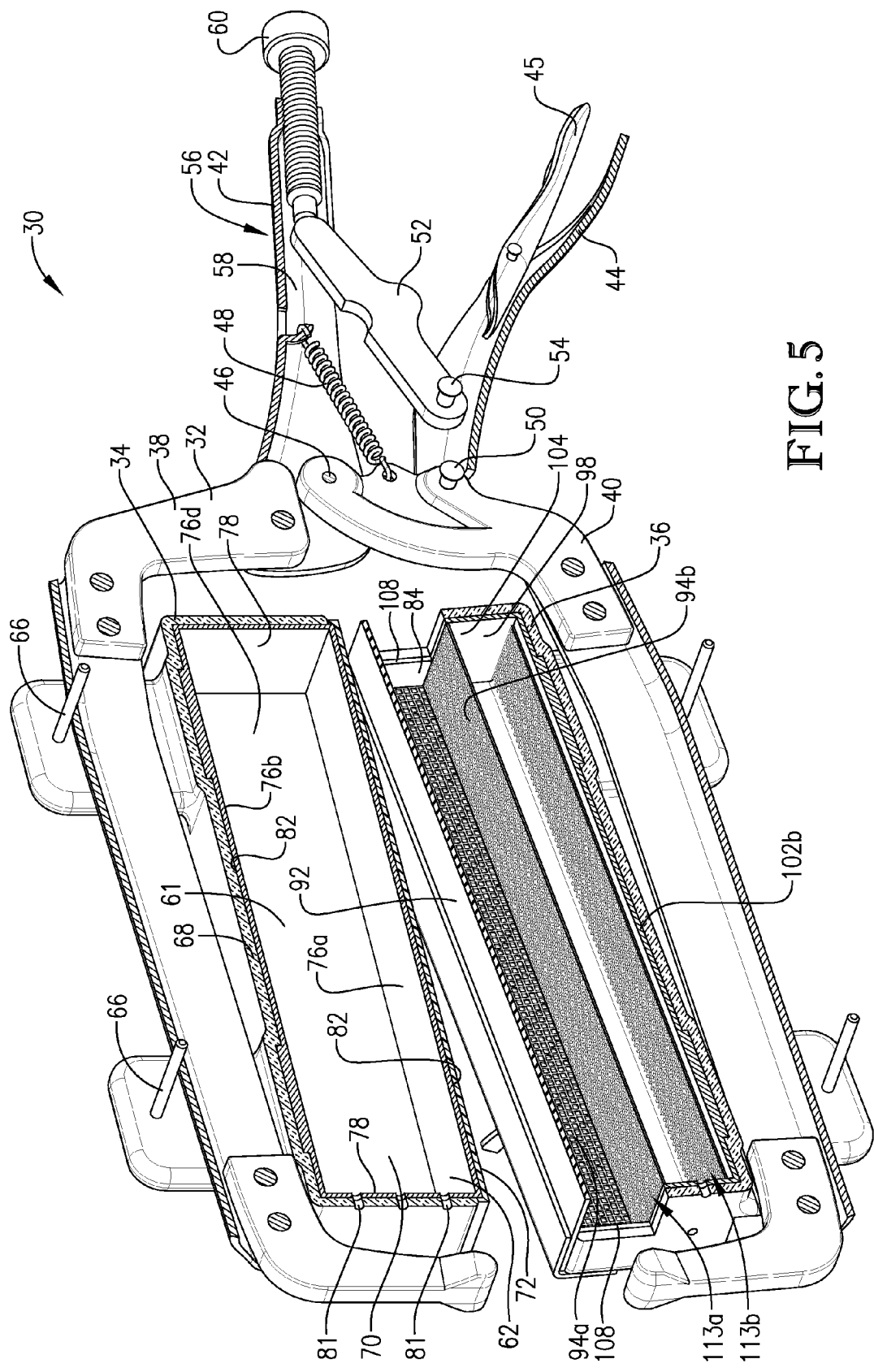
FIG. 5 is a fragmentary perspective of the cooling clamp shown in FIGS. 1-4, showing the hand clamp and receptacles cross sectioned along a longitudinal axis.

Turning initially to FIGS. 1-3, a cooling clamp 30 is constructed in accordance with a preferred embodiment of the present invention. The illustrated cooling clamp 30 is preferably used to conduct heat away from vials V that contain organic material (not shown) and are mounted alongside one another on holder H.

In the illustrated embodiment, the cooling clamp 30 is preferably configured to hold dry ice D in pelletized form. However, the cooling clamp 30 could use another type of coolant to conduct heat out of an item. As used herein, coolant broadly refers to a chilled substance that is at a temperature below the ambient temperature and is in a solid phase, liquid phase, gas phase, or in a combination of such phases. For instance, the cooling clamp 30 could alternatively hold a coolant such as water, ice, chlorofluorocarbons (CFCs), hydrofluorocarbons (HFCs), liquid nitrogen, liquid helium, etc.

Yet further, the cooling clamp 30 could include a powered chilling device used to provide a flow of coolant to the cooling clamp 30. For instance, the cooling clamp 30 could include a heat exchanger (e.g., an evaporator) powered by a refrigeration cycle.

Again, the cooling clamp 30 is preferably operable to cool (and, optionally, freeze) the vials V or at least their contents. However, the principles of the present invention are equally applicable where other objects are cooled by the cooling clamp 30. For instance, the cooling clamp 30 can receive one or more metal components for various purposes. In one application, a metal shaft (not shown) could be cooled by the clamp 30 prior to inserting the shaft into the undersized bore of another metal component so as to provide an interference fit between the bore and shaft. In another application, a heated metal part could be quenched by rapidly cooling the part through engagement with the clamp 30.

Turning to FIGS. 1-6, the illustrated cooling clamp 30 broadly includes a hand clamp 32, insulated receptacle 34, and insulated receptacle 36. The hand clamp 32 is a conventional locking C-clamp that includes a fixed jaw 38, a moving jaw 40, a fixed handle 42, a locking handle 44, and a release 45. In the usual manner, the fixed handle 42 and fixed jaw 38 are secured to one another with rivets to form a rigid unitary structure. The moving jaw 40 is pivotally attached to the fixed handle 42 with a rivet to form a pivot joint 46. The moving jaw 40 is swingable relative to the fixed jaw 38 into and out of a closed position (see FIGS. 3, 4, and 6). The hand clamp 32 also includes a spring 48 attached to the moving jaw 40 and the fixed handle 42 to urge the moving jaw 40 open (i.e., away from the closed position).

The locking handle 44 is pivotally attached to the moving jaw 40 at a pivot joint 50 adjacent the pivot joint 46. The hand clamp 32 further includes a link 52 attached to the locking handle 44 at a pivot joint 54. The link 52 presents a link end 56 (see FIG. 5) that is slidably received in a channel 58 presented by the fixed handle 42. The link end 56 is operable to engage a distal end of a screw 60 threadably mounted in the fixed handle 42.

In the usual manner, the clamp 32 can be shifted toward the closed position by swinging the locking handle 44 toward the fixed handle 42. As the handles 42,44 are moved closer to each other, the link end 56 slides proximally along the channel 58 and into engagement with the screw 60 (provided the distal end of the screw 60 is positioned within the channel 58). With the link 52 and screw 60 engaging one another, further movement of the locking handle 44 toward the fixed handle 42 causes the moving jaw 40 to overcome the force of the spring 48 and swing toward the fixed jaw 38. It will be appreciated that the jaws 38,40 could be manually moved together by manually grasping the jaws 38,40 and pushing them toward each other.

When the clamp 32 is closed and the screw 60 is positioned in engagement with the link 52, the jaws cooperatively apply a compressive force to the receptacles 34,36. In the usual manner, the link 52 and locking handle 44 cooperatively define an over-center condition when the clamp 32 is closed. In the over-center condition, the compressive force applied to the receptacles 34,36 causes the moving jaw 40 to apply a closing force to the locking handle 44 at the pivot joint 50. Because the pivot joint 54 swings inwardly past an over-center line (not shown) that extends from the pivot joint 50 to the link end 56 as the clamp 32 is closed, the closing force urges the locking handle 44 to remain in the closed position.

The clamp 32 can be moved out of the closed position by first shifting the locking handle 44 out of the over-center condition. For instance, the release 45, which is pivotally attached to the handle 44, can be depressed to initiate movement of the clamp 32 out of the over-center condition. More particularly, the release 45 is pressed at its proximal end to move the proximal end toward the handle 44. This causes a distal end of the release 58 to pry against the link 52 so that the pivot joint 54 swings outwardly past the over-center line. The handles 42,44 can then be swung away from each other to open the jaws 38,40.

The cooling clamp 30 could include an alternative hand clamp, such as the clamp illustrated in FIGS. 21-23, without departing from the scope of the present invention. Furthermore, the receptacles 34,36 could be used with a clamping mechanism other than a hand clamp. For instance, the receptacles 34,36 could be mounted onto jaws of a stationary bench vise.

Referring again to FIGS. 1-6, the receptacle 34 is attached to the fixed jaw 38 to move with the fixed jaw 38 into and out of the closed position. The receptacle 34 presents a chamber 61 (see FIG. 5) operable to contain dry ice D prior to, during, and after the cooling clamp 30 is used to cool the vials V. However, it will be appreciated that at least some of the dry ice D may evaporate and escape from the receptacle 34 during the cooling process. The receptacle 34 preferably includes a receptacle shell 62, brackets 64, fasteners 66, and an insulating layer 68 (see FIGS. 5 and 6).

The receptacle shell 62 provides a rugged enclosure and includes a shell body 70, a cover layer 72, and a shiftable door 74. The shell body 70 preferably includes a plurality of longitudinal side walls 76a-d (see FIG. 6) and end walls 78 (see FIG. 5). The side walls 76 and end walls 78 are integrally formed with one another. One of the side walls 76c preferably presents a side opening 80 (see FIG. 1).

The shell body 70 also presents vent holes 81 (see FIG. 1). The vent holes 81 are operable to vent the chamber 61 of the receptacle 34. For instance, as dry ice D within the chamber 61 sublimates to produce carbon dioxide gas, the vent holes 81 permit the carbon dioxide gas to escape from the receptacle 34.

The brackets 64 are fixed to and integrally formed with the side wall 76b. Thus, the shell body 70 and brackets 64 cooperatively form a unitary structure that presents an exterior surface 82 (see FIG. 5).

The door 74 preferably comprises a unitary plate that is shiftably attached to the side wall 76c with the corresponding fastener 66. The door 74 can be swung into and out of a closed door position where the door 74 spans and covers the side opening 80.

Access to the chamber 61 is provided by opening and closing the door 74. The illustrated chamber 61 is preferably used to hold coolant during the process of cooling an item, although the chamber 61 could also hold the item itself. The user can selectively add dry ice D to the chamber 61 by opening the door 74 to expose the side opening 80 and pouring the dry ice D through the side opening 80 and into the chamber 61. Once dry ice D has been added, the user can then cover the side opening 80 by closing the door 74. In a similar way, the user can remove dry ice D from the chamber 61 by opening the door 74 and moving the receptacle 34 so that the dry ice D falls through the side opening 80.

The receptacle shell 62, brackets 64, and the door 74 are preferably formed of a sheet metal material. More preferably, the receptacle shell 62, brackets 64, and door 74 are formed of a carbon alloy sheet steel material. However, it will be appreciated that these components could include one or more alternative materials, such as an alternative metal (e.g., stainless steel or aluminum) or a synthetic resin material.

The illustrated cover layer 72 preferably comprises a unitary flexible layer to engage the vials V. In the illustrated embodiment, the cover layer 72 includes an elastomeric material to engage the vials V, such as a silicone rubber. The silicone material preferably permits efficient thermal conduction through the cover layer 72. As will be shown, the cover layer 72 provides a direct thermal conductor between the vials V and dry ice D within the receptacle 34. However, the cover layer 72 could include an alternative material without departing from the scope of the present invention. Preferably, the illustrated cover layer 72 is applied to the side wall 76a of the shell body 70 and presents a clamping face 72a (see FIG. 1). The cover layer 72 is preferably used with the shell body 70 to prevent metal-on-metal engagement between the receptacles 34,36.

While the illustrated cover layer 72 comprises a unitary layer coated onto the shell body 70, the cover layer 72 could be alternatively configured without departing from the scope of the present invention. For some aspects of the present invention, the receptacle 34 could be devoid of the cover layer 72.

The insulating layer 68 preferably includes a material layer applied to the exterior surface 82 defined along each of the brackets 64, side walls 76b-d, and end walls 78. That is, in the illustrated embodiment, the exterior surface 82 of the side wall 76a is preferably devoid of the insulating layer 68. The insulating layer 68 preferably includes a synthetic material (e.g., an open cell or closed cell foam), but could include other materials, such as wood or ceramic material.

Again, the receptacle 34 is preferably attached to the fixed jaw 38 to move with the jaw 38 into and out of the closed position. The receptacle 34 is secured by positioning the jaw between the tabs of each bracket 64, with the clamping face 72a facing in opposition to a corresponding clamping face of the receptacle 36. The receptacle 34 is secured to the jaw 38 with fasteners 66. However, it is within the ambit of the present invention where the receptacle 34 is alternatively positioned. For instance, the receptacle 34 could be secured to the jaw 40 (e.g., where the receptacle 36 is secured to the jaw 38).

The receptacle 34 preferably has the insulating layer 68 positioned between the shell 62 and the jaw 38 to restrict thermal transfer therebetween. The insulating layer 68 is also preferably positioned between the jaw 38 and the brackets 64 to restrict thermal transfer therebetween. In this manner, the receptacle 34 is constructed to restrict heat from being transferred to the dry ice D within the receptacle 34 by the clamp 32.

Turning to FIGS. 1-10, the receptacle 36 is also operable to contain dry ice D prior to, during, and after the cooling clamp 30 is used to cool the vials V. As will be discussed, the receptacle 36 is attached to the moving jaw 40 to move with the jaw 40 into and out of the closed position. The receptacle 36 preferably includes a receptacle shell 84, brackets 86, fasteners 88, an insulating layer 90, a removable cover 92, and partitions 94,96 (see FIGS. 5-8).

The receptacle shell 84 provides a rugged enclosure and includes a shell body 98, a shiftable side door 100, and a removable end door 101. The shell body 98 preferably includes a plurality of longitudinal side walls 102 and end walls 104 (see FIGS. 6-8). The side walls 102 and end walls 104 are integrally formed with one another. The side wall 102a preferably presents a side opening 106 (see FIGS. 1 and 8). The end walls 104 each present end openings 108 (see FIG. 7). The end wall 104a also presents an auxiliary opening 110 (see FIG. 7).

Furthermore, the shell body 98 preferably presents vent holes 111 (see FIG. 8). The vent holes 111 are operable to vent the interior of the receptacle 36. For instance, as dry ice D within the receptacle 36 sublimates to produce carbon dioxide gas, the vent holes 111 permit the carbon dioxide gas to escape from the receptacle 36.

The brackets 86 are fixed to and integrally formed with the side walls 102b,102c,102d. Thus, the shell body 98 and brackets 86 cooperatively form a unitary structure that presents an exterior surface 112 (see FIG. 8).

The side door 100 preferably comprises a unitary plate that is shiftably attached to the side wall 102a with one of the fasteners 88. The side door 100 can be swung into and out of a closed door position where the side door 100 spans and covers the side opening 106.

The receptacle shell 84, brackets 86, side door 100, and end door 101 are preferably formed of a sheet metal material. More preferably, the receptacle shell 84, brackets 86, side door 100, and end door 101 are formed of a carbon alloy sheet steel material. However, it will be appreciated that these components could include one or more alternative materials, such as an alternative metal (e.g., stainless steel or aluminum) or a synthetic resin material.

The partitions 94,96 are used to divide an interior chamber 113 of the receptacle 36 into an upper sub-chamber 113a, an intermediate sub-chamber 113b, and a lower sub-chamber 113c. More particularly, the partition 94 includes side sections 94a and a central section 94b that interconnects the side sections 94a. The partition 94 is secured within the receptacle 36 by attaching the side sections 94a to corresponding side walls 102a,e with fasteners 88. The illustrated partition 94 separates and partly defines the sub-chambers 113a,113b (see FIG. 6).

The partition 96 is mounted to the wall 102b and to a ledge 114 of the wall 102e (see FIGS. 6 and 7). The illustrated partition 96 separates and partly defines the sub-chambers 113b,113c (see FIG. 6). However, it is within the ambit of the present invention where the partitions 94,96 are alternatively shaped and/or positioned to provide more or less sub-chambers 113.

The walls of partitions 94,96 are preferably formed of a perforated metal sheet material. Having this construction, the partitions 94,96 permit gases and liquids to pass between the sub-chambers 113a,113b. However, it will be appreciated that the partitions 94,96 could be made from an alternative layer of perforated (e.g., a woven fabric material) or otherwise permeable material. Yet further, it is within the ambit of the present invention where the walls of partitions 94,96 are made from an impermeable material layer that conducts heat between the sub-chambers 113.

The sub-chambers 113b and 113c are accessed via doors 100 and 101. The end door 101 is removably attached to the shell 84 to selectively cover the auxiliary opening 110. By opening and closing the end door 101, the end door 101 provides selective access to the sub-chamber 113c. The user may access the sub-chamber 113c to insert or remove the vials V relative to the sub-chamber 113c. However, the sub-chamber 113c may also be accessed by a user to add coolant to the sub-chamber 113c or remove coolant therefrom.

Similarly, access to the sub-chamber 113b is provided by opening and closing the side door 100. The illustrated sub-chamber 113b is preferably used to hold coolant during the process of cooling an item, although the sub-chamber 113b could also hold the item itself. The user can selectively add dry ice D to the sub-chamber 113b by opening the side door 100 to expose the side opening 106 and pouring the dry ice D through the side opening 106 and into the sub-chamber 113b. Once dry ice D has been added, the user can then cover the side opening 106 by closing the side door 100. In a similar way, the user can remove dry ice D from the sub-chamber 113b by opening the side door 100 and moving the receptacle 36 so that the dry ice D falls through the side opening 106.

Turning to FIGS. 5-10, the removable cover 92 is preferably operable to selectively open and close the receptacle 36. In particular, the receptacle shell 84 presents an open top 115 (see FIGS. 7 and 8), with the removable cover 92 spanning the open top 115 to cover the sub-chamber 113a.

The removable cover 92 preferably includes side rails 116 and a central lid 118 that interconnects the side rails 116 (see FIGS. 9 and 10). The side rails 116 each include cover mounting flanges 120 and lid flanges 122 that are fixed to the lid 118. The cover mounting flanges 120 present upright slots 124 for mounting the cover 92. The side rails 116 are preferably formed of a sheet metal material. More preferably, the side rails 116 are formed of a carbon alloy sheet steel material. However, it will be appreciated that these components could include one or more alternative materials, such as an alternative metal (e.g., stainless steel or aluminum) or a synthetic resin material. Preferably, the side rails 116 and lid 118 of the illustrated cover 92 cooperatively present a clamping face 126 (see FIG. 2).

The lid 118 preferably comprises a unitary elastomeric layer that is flexible and stretchable. This flexible construction allows the cover 92 to engage the vials V and flex in response to engagement so that the cover 92 cradles the vials V. This configuration also maximizes the area of engagement between the cover 92 and vials V. It has been found that maximizing the engagement area improves the thermal transfer between the vials V and the receptacle 36. In the illustrated embodiment, the lid 118 includes an elastomeric material, such as a silicone rubber. The silicone material preferably permits efficient conduction of heat through the lid 118. As will be shown, the cover 92 (including the lid 118) provides a direct thermal conductor between the vials V and dry ice D within the receptacle 36. However, as will be shown in subsequent embodiments, the lid 118 could include an alternative material without departing from the scope of the present invention. The lid 118 also preferably includes the silicone material to prevent metal-on-metal engagement between the receptacles 34,36, although other synthetic resin materials could be used to form the lid 118.

The illustrated cover 92 is removably attached to the shell body 98 with fasteners 88 that include threaded studs 88a and nuts 88b. In particular, the cover 92 is slidably mounted onto the shell body 98 by laterally aligning each of the threaded studs 88a with corresponding ones of the slots 124 and then moving the cover 92 and shell body 98 relative to each other so that the studs 88a are received by the slots 124. The cover 92 is secured into closing engagement with the shell body 98 by threading the nuts 88b onto the studs 88a and tightening the nuts 88b into engagement with the side rails 116. When secured in closing engagement with the shell 84, the cover 92 provides an exposed wall section that cooperates with the shell 84 to define the coolant receptacle.

With the cover 92 mounted on the shell body 98, the end openings 108 permit the lid 118 to be flexed inwardly (see FIG. 3) along its entire length relative to the receptacle 36 (i.e., so that the lid 118 flexes into the sub-chamber 113a). Again, this arrangement allows the cover 92 to engage the vials V and flex in response to engagement so that the cover 92 cradles the vials V. The lid 118 is preferably configured so that the lid 118 can be flexed inwardly to the extent that the lid 118 engages the partition 94b.

However, the cover 92 could be alternatively configured for mounting relative to the shell body 98. For instance, the cover 92 is shiftably mounted on the shell body 98 so that the cover 92 can be opened without being entirely removed from the shell body 98. For some aspects of the present invention, the cover 92 could be fixed to the shell 84 (i.e., where the cover 92 is not removably attached to the shell 84).

Yet further, the receptacle 36 could be devoid of the cover 92. For instance, the receptacle 34 could serve as a removable cover for the receptacle 36. In such a configuration, the vials V or another item could be inserted into the sub-chamber 113a and then the clamp 32 could be closed so that the receptacle 34 covers the sub-chamber 113a.

The insulating layer 90 preferably includes a material layer applied to the exterior surface 112 defined along each of the brackets 86, the side walls 102, and the end walls 104. The insulating layer 90 preferably includes a synthetic material (e.g., an open cell or closed cell foam), but could include other materials, such as wood or ceramic material.

The cover 92 is preferably devoid of the insulating layer 90 so as to provide an exposed wall section. Again, the exposed wall section preferably cooperates with the shell 84 to define the coolant receptacle. However, for some aspects of the present invention, an insulating layer could be applied to at least part of the cover 92. For instance, an insulating layer could be applied to cover part of the exterior surface of the cover 92 so that the uncovered part of the exterior surface would remain exposed. That is, in one alternative embodiment, the cover 92 could include an exposed wall section that presents the uncovered part of the exterior surface.

The receptacle 36 is preferably attached to the moving jaw 40 to move with the jaw 40 into and out of the closed position. The receptacle 36 is secured by positioning the jaw 40 between the tabs of each bracket 86, with the clamping face 126 facing in opposition to the clamping face 72a of the receptacle 34. The receptacle 36 is secured to the jaw 40 with fasteners 66. However, it is within the ambit of the present invention where the receptacle 36 is alternatively positioned. For instance, the receptacle 36 could be secured to the jaw 38 (e.g., where the receptacle 34 is secured to the jaw 40).

The receptacle 36 preferably has the insulating layer 90 positioned between the shell 84 and the jaw 40 to restrict thermal transfer therebetween. The insulating layer 90 is also preferably positioned between the jaw 40 and the brackets 86 to restrict thermal transfer therebetween. In this manner, the receptacle 36 is constructed to restrict heat from being transferred to the dry ice D within the receptacle 36 by the clamp 32.

For some aspects of the present invention, the illustrated cooling clamp 30 could include only one of the receptacles 34,36. For instance, the cooling clamp 30 could have the receptacle 36 provide the clamping face 126, with the jaw 38 including structure that presents the opposite clamping face 72a.

Furthermore, while the illustrated cooling clamp 30 has discrete receptacles 34,36 attached to respective jaws 38,40, the cooling clamp 30 could have a single receptacle that is operably attached to both jaws 38,40 and presents the opposed clamping faces 72a,126. For instance, such a receptacle could have receptacle sections that are mounted on corresponding jaws 38,40 and present corresponding faces 72a,126, with the receptacle sections being fluidly interconnected by an extendable section.

The receptacles 34,36 can be shifted by the clamp 32 toward the closed position by swinging the locking handle 44 toward the fixed handle 42. As the handles 42,44 are moved closer to each other, the link end 56 slides proximally along the channel 58 and into engagement with the screw 60 (provided the distal end of the screw 60 is positioned within the channel 58). With the link 52 and screw 60 engaging one another, further movement of the locking handle 44 toward the fixed handle 42 causes the moving jaw 40 to overcome the force of the spring 48 and swing the receptacles 34,36 toward each other. The receptacles 34,36 could be manually moved together by manually grasping the jaws 38,40 and pushing them toward each other.

As discussed above, the jaws 38,40 can be selectively moved into and out of an over-center condition when the jaws 38,40 are closed such that the receptacles 34,36 cooperatively apply a compressive force. In the over-center condition, the clamp 32 removably locks the receptacles 34,36 into engagement with each other in the closed position (see FIG. 3).

As discussed above, the cover 92 has a flexible construction that allows the cover 92 to flex in response to engagement with the vials V (see FIG. 3). As the receptacles 34,36 are moved by the jaws 38,40 into the closed position, the end openings 108 allow the lid 118 to flex inwardly relative to the receptacle 36. Because the jaws 38,40 urge the receptacles 34,36 into engagement with one another, the receptacles 34,36 cooperatively apply pressure to and thereby grasp the vials V and holder H.

When the vials V are grasped between the receptacles 34,36, the cover layer 72 provides a direct thermal conductor between the vials V and dry ice D within the receptacle 34. Similarly, the cover 92 (including the lid 118) provides a direct thermal conductor between the vials V and dry ice D within the receptacle 36.

However, for some aspects of the present invention, at least one of the receptacles 34,36 could be used to engage and cool the vials V and holder H without these items being grasped between the receptacles 34,36. For instance, the vials V and holder H could be alternatively positioned within the sub-chamber 113c (see FIG. 7). The vials V and holder H could also be positioned within the sub-chamber 113a.

Again, the receptacles 34,36 are preferably configured to hold dry ice D in pelletized form. However, the receptacles 34,36 may alternatively hold another type of coolant to conduct heat out of an item, without departing from the spirit of the present invention. For instance, the receptacles 34,36 could alternatively hold a coolant such as water, ice, liquid nitrogen, etc. Yet further, the receptacles 34,36 could include or be associated with a powered chilling device. For instance, the receptacles 34,36 could include or be associated with a heat exchanger (e.g., an evaporator) powered by a refrigeration cycle.

In operation, items such as vials V can be cooled with the cooling clamp 30 by initially filling one or more of the chambers 61,113 with dry ice D. For instance, in the illustrated embodiment, chamber 61 and sub-chamber 113b contain dry ice D (see FIG. 3). With the cooling clamp 30 in an open position, the vials V can be positioned on the holder H and located between the clamping faces 72a,126 (see FIG. 2). The vials V are preferably located laterally within the perimeter of each clamping face 72a,126 so that the vials V do not project laterally outboard from the receptacles 34,36. However, it will be appreciated that the item being cooled could alternatively be only partly grasped between the receptacles 34,36.

Once the vials V and holder H are located between the clamping faces 72a,126, the clamp 32 can be closed by moving the handles 42,44 toward each other, which causes the jaws 38,40 to be brought together and into the closed position. Optionally, with the jaws 38,40 closed, the handles 42,44 can be moved into the over-center condition so that the clamp 32 removably locks the clamping faces 72a,126 into grasping engagement with the vials V and holder H.

The vials V and holder H can be released from grasping engagement with the clamping faces 72a,126 by opening the clamp 32. If the clamp 32 is in the over-center condition, the vials V and holder H are released by initially shifting the clamp 32 out of the over-center condition. The handles 42,44 can then be swung away from each other to open the jaws 38,40 and thereby move the clamping faces 72a,126 away from each other.

Turning to FIGS. 11-23, alternative preferred embodiments of the present invention are depicted. For the sake of brevity, the remaining description will focus primarily on the differences of these alternative embodiments from the preferred embodiment described above.

Initially turning to FIGS. 11 and 12, an alternative lower receptacle 200 is constructed in accordance with a second embodiment of the present invention. The lower receptacle 200 preferably includes a receptacle shell 202, a shell cover layer 204, brackets 206, an insulating layer 208, and a shiftable cover 210.

The receptacle shell 202 provides a rugged enclosure and includes a shell body 212 and a shiftable side door 214. The shell body 212 preferably includes a plurality of longitudinal side walls 216a-d and an end wall (not shown). The side wall 216c preferably presents a side opening 218. The side walls 216 cooperatively define an open end 220 and a continuous chamber 222. The cover layer 204 is similar to cover layer 72 and is applied to the side wall 216a of the shell body 212.

The shiftable cover 210 is preferably operable to selectively open and close the receptacle 200. In particular, the shiftable cover 210 spans the open end 220 to cover the chamber 222. The removable cover 210 is unitary and includes a body 224 with a recessed perimeter lip 226. The cover 210 also includes a catch 228 fixed to an inner surface of the body 224. The catch 228 frictionally engages the shell 202 when the cover 210 is closed. The cover 210 also presents vent holes 230.

The illustrated cover 210 is removably attached to the shell body 212 with a pivotal hinge 232 so that the cover 210 can swing into and out of the closed position about an upright axis.

Turning to FIGS. 13 and 14, an alternative removable cover 300 is constructed in accordance with a third embodiment of the present invention. The cover 300 is preferably configured for use with the receptacle 36 as an alternative to the removable cover 92. The cover 300 preferably includes a unitary cover body 302 with elongated cover mounting flanges 304 and a central lid section 306. The cover mounting flanges 304 present upright slots 308 for mounting the cover 300. The cover body 302 is preferably formed of a sheet metal material. More preferably, the cover body 302 is formed of a carbon alloy sheet steel material. However, it will be appreciated that the cover body 302 could include one or more alternative materials, such as an alternative metal (e.g., stainless steel or aluminum) or a synthetic resin material.

The cover 300 also preferably includes a cover layer 310. Similar to cover layer 72, the cover layer 310 preferably comprises a unitary flexible layer to engage the vials V. The illustrated cover layer 310 includes an elastomeric material to engage the vials V, such as a silicone rubber. The illustrated cover layer 310 is applied to the central lid section 306 of the cover body 302.

Again, the illustrated removable cover 300 is preferably used as an alternative cover for the receptacle 36. However, it is within the scope of the present invention where the receptacle 34 is configured to receive the removable cover 300.

Turning to FIGS. 15-18, an alternative cooling clamp 400 is constructed in accordance with a fourth embodiment of the present invention. The clamp 400 preferably includes a hand clamp 402, insulated receptacle 404, and an alternative insulated receptacle 406. The alternative receptacle 406 preferably includes a receptacle shell 408, brackets 410, fasteners 412, an insulating layer 414, partitions 416,418, and an alternative removable cover 420.

The removable cover 420 includes a cover frame 422, a lid 424, and a partition 426. The cover frame 422 includes elongated cover mounting flanges 428 and presents a central cover opening 430. The cover mounting flanges 428 present upright slots 432 for mounting the cover 400. The lid 424 preferably includes a flange section 434 that presents upright slots 436 to mount the lid 424. The lid 424 is secured to the cover frame 422 so that the lid 424 spans the cover opening 430.

The cover frame 422 and lid 424 are preferably formed of a sheet metal material. More preferably, the cover frame 422 and lid 424 are formed of a carbon alloy sheet steel material. However, it will be appreciated that the cover frame 422 and lid 424 could include one or more alternative materials, such as an alternative metal (e.g., stainless steel or aluminum) or a synthetic resin material.

The partition 426 comprises an elongated channel with a bottom wall 438, side walls 440, and end walls 442. The illustrated partition 426 is preferably fixed to the cover frame 422 to span the cover opening 430 and extend below the lid 424. Thus, the lid 424 and the partition 426 cooperatively form a sub-chamber 444 (see FIG. 18).

The walls of the partition 426 are preferably formed of a perforated metal sheet material. However, it will be appreciated that the partitions 94,96 could be made from an alternative layer of perforated (e.g., a woven fabric material) or otherwise permeable material. As will be shown in a subsequent embodiment, the walls of the partition 426 could be made from an impermeable material layer that conducts heat.

When the cover 420 is secured to the shell 408, the partition 416, cover frame 422, and partition 426 cooperatively form a sub-chamber 446, with the receptacle 406 also presenting sub-chambers 448,450.

Turning to FIGS. 19 and 20, an alternative cover 500 is constructed in accordance with a fifth embodiment of the present invention. The cover 500 includes a cover frame 502 and a partition 504. The cover 500 could also include a lid (not shown) similar to lid 424. The cover frame 502 includes elongated cover mounting flanges 506 and presents a central cover opening 508.

The partition 504 comprises an elongated channel with a bottom wall 510, side walls 512, and end walls 514. The partition 504 is preferably fixed to the cover frame 502 to span the cover opening 508 and extend below the cover opening 508.

The cover frame 502 and partition 504 are preferably formed of a sheet metal material. More preferably, the cover frame 502 and partition 504 are formed of a carbon alloy sheet steel material. However, it will be appreciated that the cover frame 502 and partition 504 could include one or more alternative materials, such as an alternative metal (e.g., stainless steel or aluminum) or a synthetic resin material.

Turning to FIGS. 21-23, an alternative cooling clamp 600 is constructed in accordance with a sixth embodiment of the present invention. The clamp 600 preferably includes a C-clamp 602 and alternative receptacles 604,606.

The C-clamp 602 is a conventional metal clamp and includes a clamp frame 608, a threaded rod 610, a movable jaw 612, and a handle 614. The clamp frame 608 is a unitary structure and preferably includes a fixed jaw 616 and a threaded bushing 618 that rotatably receives the threaded rod 610.

The alternative receptacles 604,606 are mirror images of one another and each includes a receptacle shell 620, a bracket 622, fasteners 624, and an insulating layer 626 (see FIGS. 21 and 23). The shell 610 provides a rugged enclosure and includes a shell body 628 and a swingable door 630. The shell body 628 preferably includes four (4) side walls 632 and end walls 634,636 (see FIG. 23). The side walls 632 and end walls 636 present vent holes 637. One of the side walls 632 presents a side opening 638 (see FIG. 23). The walls 632,634,636 cooperatively define a continuous chamber 640. Each receptacle 604,606 further includes a cover layer 642 similar to cover layer 72. The cover layer 642 is applied to the end wall 634 of the shell body 628.

Each bracket 622 is fixed to and integrally formed with the end wall 636. Each bracket 622 presents an elongated opening 644 that is sized to receive a corresponding one of the jaws 612,616. Furthermore, a slot 646 is defined between the bracket 622 and the end wall 636 to slidably receive the end of the corresponding jaw 612,616. It will be appreciated that each bracket 622 can be selectively slidably mounted to the corresponding jaw 612,616 and removed therefrom.

Similar to the previous embodiments, the receptacles 604,606 are both configured to receive coolant in the form of dry ice D. An item to be cooled can be selectively positioned between the cover layers 642 so that the receptacles 604,606 can be brought into grasping engagement with the item by the C-clamp 602.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A cooling clamp operable to hold coolant and an item in proximity to one another, said cooling clamp comprising:
   a pair of relatively shiftable jaws operable to shift into and out of a closed position, with the jaws being configured to receive at least a portion of the item therebetween and apply a clamping pressure to the item when in the closed position; and
   a receptacle mounted to at least one of the jaws and presenting a chamber to receive the coolant,
   said receptacle including an exposed wall section defining in part the chamber and being configured to contact the item when the jaws are in the closed position, with the exposed wall section thereby serving as a direct thermal conductor between the item and the coolant,
   said receptacle including a receptacle shell and an insulating layer positioned along the shell so that the receptacle is insulated.

2. The cooling clamp as claimed in claim 1,
   said clamp presenting opposed clamping faces between which the item is clamped when the jaws are in the closed position,
   said exposed wall section defining at least part of one of the clamping faces.

3. The cooling clamp as claimed in claim 2,
   said exposed wall section including a rigid layer such that the wall section is restricted from flexing in response to engagement with the item.

4. The cooling clamp as claimed in claim 2; and
   another receptacle presenting another chamber to receive the coolant, with each of the receptacles being mounted to a respective one of the jaws,
   said another receptacle including another exposed wall section defining in part the another chamber,
   said exposed wall sections being opposed to one another and thereby configured to cooperatively grasp the item when the jaws are in the closed position, with the exposed wall sections both serving as direct thermal conductors between the item and the coolant.

5. The cooling clamp as claimed in claim 1,
   said insulating layer being located between the receptacle and the at least one of the jaws to restrict thermal transfer therebetween.

6. The cooling clamp as claimed in claim 1,
   said receptacle including a pair of spaced apart brackets fixed to the shell, with the brackets being secured on opposite sides of one of the jaws so as to cooperatively mount the receptacle thereto, said insulating layer being located between the brackets and the one jaw to restrict thermal transfer therebetween.

7. The cooling clamp as claimed in claim 1, said receptacle including a receptacle shell and a pair of spaced apart brackets fixed to the shell, with the brackets being secured on opposite sides of one of the jaws so as to cooperatively mount the receptacle thereto.

8. A cooling clamp operable to hold coolant and an item in proximity to one another, said cooling clamp comprising:

a pair of relatively shiftable jaws operable to shift into and out of a closed position, with the jaws being configured to receive at least aportion of the item therebetween and apply a clamping pressure to the item when in the closed position; and a receptacle mounted to at least one of the jaws and presenting a chamber to receive the coolant, said receptacle including an exposed wall section defining in part the chamber and being configured to contact the item when the jaws are in the closed position, with the exposed wall section thereby serving as a direct thermal conductor between the item and the coolant, said clamp presenting opposed clamping faces between which the item is clamped when the jaws are in the closed position, said exposed wall section defining at least part of one of the clamping faces, said exposed wall section including a flexible elastomeric layer such that the wall section resiliently flexes in response to engagement with the item and thereby conforms to the item.

9. The cooling clamp as claimed in claim 8, said receptacle including a receptacle shell and a removable cover that forms the exposed wall section, said receptacle shell presenting an open top, with the removable cover spanning the open top.

10. A cooling clamp operable to hold coolant and an item in proximity to one another, said cooling clamp comprising:

a pair of relatively shiftable jaws operable to shift into and out of a closed position, with the jaws being configured to receive at least a portion of the item therebetween and apply a clamping pressure to the item hen in the closed position;

a receptacle mounted to at least one of the jaws and presenting a chamber to receive the coolant, said receptacle including an exposed wall section defining in part the chamber and being configured to contact the item when the jaws are in the closed position, with the exposed wall section thereby serving as a direct thermal conductor between the item and the coolant, said clamp presenting opposed clamping faces between which the item is clamped when the jaws are in the closed position, said exposed wall section defining at least part of one of the clamping faces; and another receptacle presenting another chamber to receive the coolant, with each of the receptacles being mounted to a respective one of the jaws, said another receptacle including another exposed wall section defining in part the another chamber, said exposed wall sections being opposed to one another and thereby configured to cooperatively grasp the item when the jaws are in the closed position, with the exposed wall sections both serving as direct thermal conductors between the item and the coolant, at least one of said exposed wall sections including a flexible elastomeric layer such that the at least one exposed wall section resiliently flexes and thereby conforms to the item in response to the item being grasped by the exposed wall sections.

11. A cooling clamp operable to hold coolant and an item in proximity to one another, said cooling clamp comprising:

a pair of relatively shiftable jaws operable to shift into and out of a closed position, with the jaws being configured to receive at least a portion of the item therebetween and apply a clamping pressure to the item when in the closed position; and a receptacle mounted to at least one of the jaws and presenting a chamber to receive the coolant, said receptacle including an exposed wall section defining in part the chamber and being configured to contact the item when the jaws are in the closed position, with the exposed wall section thereby serving as a direct thermal conductor between the item and the coolant, said clamp presenting opposed clamping faces between which the item is clamped when the jaws are in the closed position, said exposed wall section defining at least part of one of the clamping faces, said receptacle including a receptacle shell and a removable cover that forms the exposed wall section, said receptacle shell presenting an open top, with the removable cover spanning the open top.

12. The cooling clamp as claimed in claim 11, said removable cover including a frame, a lid, and a partition, said frame presenting a cover opening that is at least substantially spanned by the lid, said partition being attached to the frame and serving to section the chamber into sub-chambers, with one of the sub-chambers being cooperatively defined by the lid and partition.

13. A cooling clamp operable to hold coolant and an item in proximity to one another, said cooling clamp comprising:

a pair of relatively shiftable jaws operable to shift into and out of a closed position, with the jaws being configured to receive at least a portion of the item therebetween and apply a clamping pressure to the item when in the closed position; and a receptacle mounted to at least one of the jaws and presenting a chamber to receive the coolant, said receptacle including an exposed wall section defining in part the chamber and being configured to contact the item when the jaws are in the closed position, with the exposed wall section thereby serving as a direct thermal conductor between the item and the coolant, said receptacle including a receptacle shell, a lid, and a partition mounted within the receptacle shell to section the chamber into sub-chambers, with one of the sub-chambers being cooperatively defined by the lid and partition.

14. The cooling clamp as claimed in claim 13, said partition being perforated to allow gas to pass between the chambers.

15. The cooling clamp as claimed in claim 13, said receptacle including a removable cover that foums the exposed wall section, said receptacle shell presenting an open top, with the removable cover spanning the open top.

16. The cooling clamp as claimed in claim 15, said removable cover including a frame, the lid, and the partition, said frame presenting a cover opening that is at least substantially spanned by the lid,
said partition being attached to the frame and cooperating with the lid to at least partly define one of the sub-chambers.

17. The cooling clamp as claimed in claim 13,
said exposed wall section including a flexible elastomeric layer such that the wall section resiliently flexes in response to engagement with the item and thereby conforms to the item,
said wall section being spaced from the partition and operable to flex toward the partition when engaging the item.

18. An insulated coolant receptacle operable to be mounted to at least one of a pair of relatively shiftable jaws of a clamp, said jaws operable to shift into and out of a closed position, said jaws being configured to receive at least a portion of an item therebetween and apply a clamping pressure to the item when in the closed position, said insulated coolant receptacle comprising:
    a receptacle shell presenting an exterior shell surface;
    an exposed wall section cooperating with the receptacle shell to define a coolant chamber,
    said exposed wall section being configured to contact the item when the jaws are in the closed position, with the exposed wall section thereby serving as a direct thermal conductor between the item and the coolant; and
    an insulating layer applied to the exterior shell surface and operable to insulate coolant within the chamber from ambient conditions.

19. The insulated coolant receptacle as claimed in claim 18,
    said exposed wall section including a flexible elastomeric layer such that the wall section resiliently flexes in response to engagement with the item and thereby conforms to the item.

20. The insulated coolant receptacle as claimed in claim 19; and
    a removable cover that forms the exposed wall section,
    said receptacle shell presenting an open top, with the removable cover spanning the open top.

21. The insulated coolant receptacle as claimed in claim 18,
    said exposed wall section including a rigid layer such that the wall section is restricted from flexing in response to engagement with the item.

22. The insulated coolant receptacle as claimed in claim 18; and
    a removable cover that forms the exposed wall section,
    said receptacle shell presenting an open top, with the removable cover spanning the open top.

23. The insulated coolant receptacle as claimed in claim 22,
    said removable cover including a frame, a lid, and a partition,
    said frame presenting a cover opening that is at least substantially spanned by the lid,
    said partition being attached to the frame and serving to section the chamber into sub-chambers, with one of the sub-chambers being cooperatively defined by the lid and partition.

24. The insulated coolant receptacle as claimed in claim 18; and
    a pair of spaced apart brackets fixed to the shell, with the brackets operable to be secured on opposite sides of one of the jaws so as to cooperatively mount the receptacle thereto,
    said insulating layer operable to be located between the brackets and the one jaw to restrict thermal transfer therebetween.

25. The insulated coolant receptacle as claimed in claim 18; and
    a partition mounted within the receptacle shell to section the chamber into sub-chambers, with one of the sub-chambers being cooperatively defined by the lid and partition.

26. The insulated coolant receptacle as claimed in claim 25,
    said partition being perforated to allow gas to pass between the sub-chambers.

27. The insulated coolant receptacle as claimed in claim 25; and
    a removable cover that forms the exposed wall section,
    said receptacle shell presenting an open top, with the removable cover spanning the open top.

28. The insulated coolant receptacle as claimed in claim 27,
    said removable cover including a frame, a lid, and the partition,
    said frame presenting a cover opening that is at least substantially spanned by the lid,
    said partition being attached to the frame and cooperating with the lid to at least partly define one of the sub-chambers.

29. The insulated coolant receptacle as claimed in claim 25,
    said exposed wall section including a flexible elastomeric layer such that the wall section resiliently flexes in response to engagement with the item and thereby conforms to the item,
    said wall section being spaced from the partition and operable to flex toward the partition when engaging the item.

30. A coolant receptacle operable to be mounted to at least one of a pair of relatively shiftable jaws of a clamp, said jaws operable to shift into and out of a closed position, said jaws being configured to receive at least a portion of an item therebetween and apply a clamping pressure to the item when in the closed position, said coolant receptacle comprising:
    a receptacle shell; and
    an exposed wall section cooperating with the receptacle shell to define a coolant chamber,
    said exposed wall section being configured to contact the item when the jaws are in the closed position, with the exposed wall section thereby serving as a direct thermal conductor between the item and the coolant
    said exposed wall section including a flexible elastomeric layer such that the wall section resiliently flexes in response to engagement with the item and thereby conforms to the item.

31. The coolant receptacle as claimed in claim 30; and
    a removable cover that forms the exposed wall section,
    said receptacle shell presenting an open top, with the removable cover spanning the open top.

32. The coolant receptacle as claimed in claim 31,
    said removable cover including a frame, a lid, and a partition,
    said frame presenting a cover opening that is at least substantially spanned by the lid,
    said partition being attached to the frame and serving to section the chamber into sub-chambers, with one of the sub-chambers being cooperatively defined by the lid and partition.

33. The coolant receptacle as claimed in claim 30,
said receptacle including a pair of spaced apart brackets fixed to the shell, with the brackets operable to be secured on opposite sides of one of the jaws so as to cooperatively mount the receptacle thereto.

34. The coolant receptacle as claimed in claim 30; and
a partition mounted within the receptacle shell to section the chamber into sub-chambers, with one of the sub-chambers being cooperatively defined by the lid and partition.

35. The coolant receptacle as claimed in claim 34,
said partition being perforated to allow gas to pass between the chambers.

36. The coolant receptacle as claimed in claim 34,
said receptacle including a removable cover that forms the exposed wall section,
said receptacle shell presenting an open top, with the removable cover spanning the open top.

37. The coolant receptacle as claimed in claim 36,
said removable cover including a frame, a lid, and the partition,
said frame presenting a cover opening that is at least substantially spanned by the lid,
said partition being attached to the frame and cooperating with the lid to at least partly define one of the sub-chambers.

38. The coolant receptacle as claimed in claim 34,
said wall section being spaced from the partition and operable to flex toward the partition when engaging the item.

* * * * *